United States Patent
Hua et al.

(10) Patent No.: US 10,447,737 B2
(45) Date of Patent: Oct. 15, 2019

(54) DELEGATING ADMINISTRATION RIGHTS USING APPLICATION CONTAINERS

(71) Applicant: salesforce.com, inc., San Francisco, CA (US)

(72) Inventors: Jimmy Hua, San Francisco, CA (US); Belinda Wong, San Bruno, CA (US); Aris Chang, Somerville, MA (US); Anjesh Dubey, Union City, CA (US); Sukrutha Raman Bhadouria, San Francisco, CA (US); Bharath Kumar Pareek, Union City, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

(21) Appl. No.: 15/185,340

(22) Filed: Jun. 17, 2016

(65) Prior Publication Data

US 2016/0294881 A1  Oct. 6, 2016

Related U.S. Application Data

(63) Continuation-in-part of application No. 13/935,074, filed on Jul. 3, 2013, now Pat. No. 9,628,493.

(60) Provisional application No. 61/667,508, filed on Jul. 3, 2012.

(51) Int. Cl.
*H04L 29/06* (2006.01)

(52) U.S. Cl.
CPC ............. *H04L 63/20* (2013.01); *H04L 63/10* (2013.01); *H04L 63/102* (2013.01); *H04L 63/08* (2013.01)

(58) Field of Classification Search
CPC ....... H04L 63/20; H04L 63/10; H04L 63/102; H04L 63/08; H04L 29/06
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

U.S. Appl. No. 13/986,251, Apr. 16, 2013.

*Primary Examiner* — Khalil Naghdali
*Assistant Examiner* — Shaqueal D Wade
(74) *Attorney, Agent, or Firm* — Dergosits & Noah LLP; Todd A. Noah

(57) ABSTRACT

A computer implemented method for delegating administration duties using application containers may include associating, by a database system, a custom object to a delegated administrator; associating, by the database system, an application container with a custom object; and enabling, by the database system, the delegated administrator to manage the custom object based on permissions included in the application container, wherein the application container includes a subset of permission included in an application permission.

20 Claims, 23 Drawing Sheets

(56) References Cited

U.S. PATENT DOCUMENTS

| | | | |
|---|---|---|---|
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,526,513 B1 | 2/2003 | Shrader | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,047,241 B1* | 5/2006 | Erickson | G06F 21/10 |
| 7,062,502 B1 | 6/2006 | Kesler | |
| 7,127,461 B1* | 10/2006 | Zhu | G06F 21/6218 |
| | | | 707/694 |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,458,314 B1* | 6/2013 | Andrus | G06Q 10/06 |
| | | | 709/203 |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,689,298 B2 | 4/2014 | Connor et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0163438 A1* | 8/2003 | Barnett | G06F 17/30289 |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0044426 A1 | 2/2005 | Vogel et al. | |
| 2005/0050555 A1 | 3/2005 | Exley et al. | |
| 2005/0091098 A1 | 4/2005 | Brodersen et al. | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2009/0193499 A1* | 7/2009 | Srivastava | G06F 21/6218 |
| | | | 726/2 |
| 2010/0192067 A1* | 7/2010 | Casalaina | G06F 16/24573 |
| | | | 715/742 |
| 2011/0219433 A1* | 9/2011 | Albrecht-Buehler | |
| | | | G06F 9/45533 |
| | | | 726/4 |
| 2012/0042362 A1 | 2/2012 | Vlasov | |
| 2012/0109835 A1 | 5/2012 | Barefoot et al. | |
| 2012/0233137 A1 | 9/2012 | Jakobson et al. | |
| 2013/0024909 A1 | 1/2013 | Morita | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0359537 A1 | 12/2014 | Jakobson et al. | |
| 2015/0007050 A1 | 1/2015 | Jakobson et al. | |
| 2015/0095162 A1 | 4/2015 | Jakobson et al. | |
| 2015/0172563 A1 | 6/2015 | Jakobson et al. | |

* cited by examiner

FIGURE 15

DELEGATING ADMINISTRATION RIGHTS USING APPLICATION CONTAINERS

PRIORITY CLAIM AND RELATED APPLICATIONS

This application is also a continuation-in-part application of U.S. application Ser. No. 13/935,074, filed Jul. 3, 2013, which claims priority to U.S. Provisional Patent Application No. 61/667,508, filed Jul. 3, 2012. This application is also related to U.S. application Ser. No. 13/065,902, filed Mar. 31, 2011; U.S. application Ser. No. 14/502,793, filed Sep. 30, 2014; and U.S. application Ser. No. 13/886,848, filed May 3, 2013, now U.S. Pat. No. 8,973,106, issued Mar. 3, 2015, the entire contents of which are incorporated herein by reference as if set forth in full herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to methods and systems for performing administration operations in a computing environment, and more specifically for delegation of the administration operations.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Generally, an administrator is someone in an organization who has the responsibilities to manage users, data, and security. The administrator may also have the responsibilities to define workflow, customize applications, generate reports, and design dashboards. It is expected that an administrator spends much time and effort managing the users and how they can access the data, especially when the organization has many users and complex hierarchy. When the number of administrators is limited, their services and response time may be affected.

BRIEF DESCRIPTION OF THE DRAWINGS

The included drawings are for illustrative purposes and serve only to provide examples of possible structures and process operations for the disclosed inventive systems, apparatus, methods and computer-readable storage media for delegating administration rights which may include rights to manage permission sets and rights to validate user assignments using customize application containers. These drawings in no way limit any changes in form and detail that may be made by one skilled in the art without departing from the spirit and scope of the disclosed implementations.

FIGS. 15-19 show images of graphical user interfaces presented in a web browser at a client machine, in accordance with one or more implementations.

DETAILED DESCRIPTION

Figure 1:
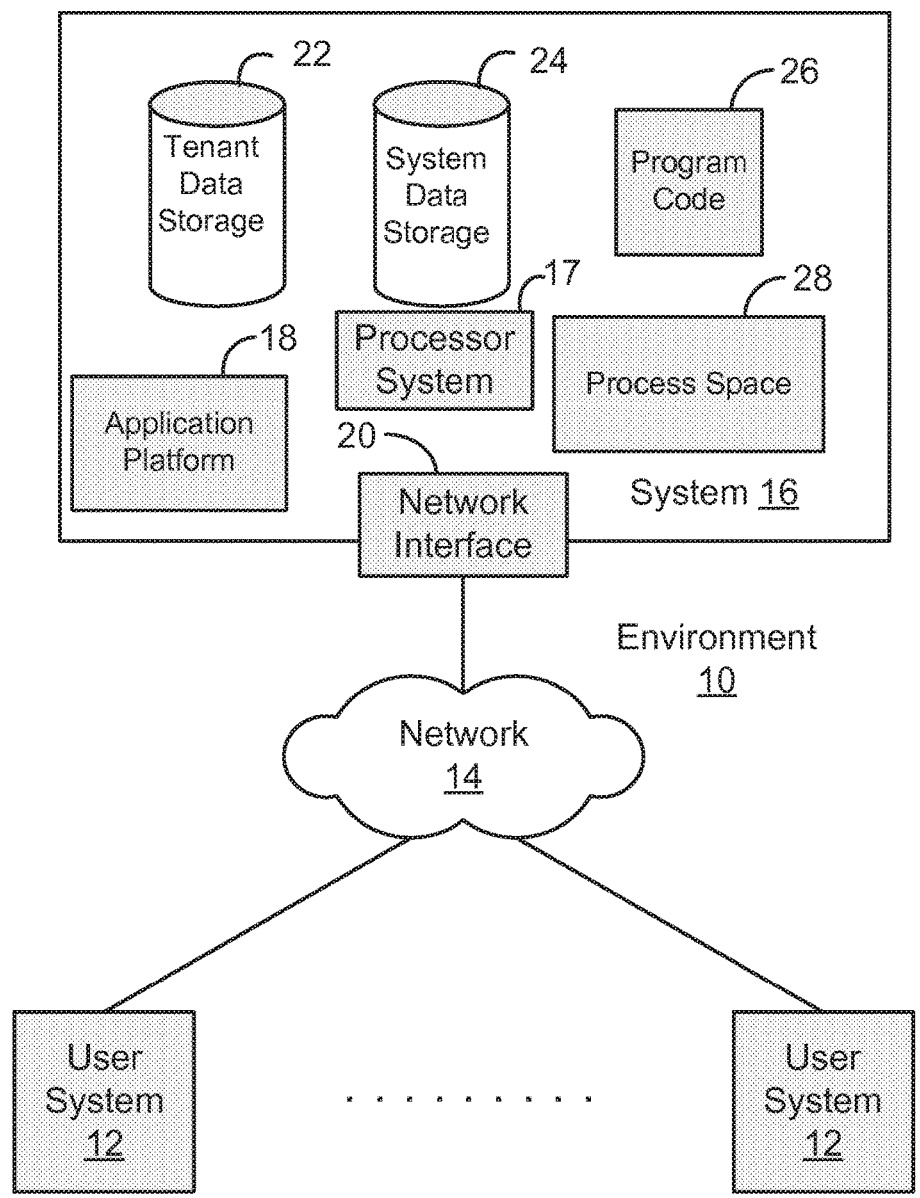
FIG. 1 shows a block diagram of an example of an environment 10 in which an on-demand database service can be used in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different systems, apparatus, methods and computer-readable storage media for establishing delegated administration using customize application containers. In general, a system administrator (also referred to as an administrator) is someone in an organization who is assigned a system administrator profile. When a user is assigned a system administrator profile, the user is also granted a very powerful permission that specifies what tasks the user can perform and what features the user can access. For an administrator, that powerful permission is referred to as a customize application permission. For example, when the customize application permission is enabled or granted, the following permission are enabled: customize the organization using App Setup menu options; edit messages and custom links; modify standard picklist values; create, edit, and delete custom fields; create, edit, and delete page layouts (also requires the "Edit" permission for the object, for example, "Edit" on accounts); set field-level security; create, edit, and delete custom links; edit the Lead Settings; activate big deal alerts; create record types; set up Web-to-Case and email response rules; set up Web-to-Lead and email response rules; set up assignment and escalation rules; set up business hours; set up Email-to-Case or On-Demand Email-to-Case; edit Self-Service page layouts and portal color theme (also requires the "Manage Self-Service Portal" permission to set up and maintain Self-Service settings and delete your organization's Self-Closed Case Status value); set up and enable multilingual solutions; set up team selling; set up account teams; map custom lead fields; manage queues; create, edit, and delete workflow rules, tasks, field updates, outbound messages, and alerts; create, edit, and delete custom s-controls, custom objects, and custom tabs; rename tabs; manage custom apps and Service Cloud console apps; create and edit public calendars and resources; set up the console; enable, set up, and modify the Salesforce Customer Portal; set up and schedule analytic snapshots to run; create communities for ideas and answers; create Visualforce email templates.

An administrator may use delegated administration to assign limited administration privileges to users who are not assigned the system administrator profile. These users are referred to as delegated administrators. Setting up a delegated administrator may include assigning delegated administration permission to a user. In general, only an administrator or a user who has a profile with the permissions of "Customize Application" and "View Setup and Configuration" can setup a delegated administrator or multiple delegated administrators. For example, when setting up a delegated administrator, the administrator may specify the roles and subordinates that a delegated administrator may create and edit users. The administrator may specify the profiles that a delegated administrator may assign to the users that the delegated administrator create and update. The administrator may specify custom objects that a delegated administrator can manage. The administrator may specify permission sets that a delegated administrator can assign to the users that the delegated administrator create and update.

A delegated administration group may be set up to include one or more delegated administrators. A delegated administration group may include information about the delegated administrators, how the delegated administrators can perform user administration tasks, and how the delegated administrators can control the ability of the users to access organization resources via assignable profiles, assignable permission sets, and custom objects.

For some implementations, an administrator may define multiple delegated administration groups. An administrator may also include a user (as a delegated administrator) in different delegated administration groups. When a delegated administrator is assigned to multiple delegated administration groups, the delegated administrator may administer users across those delegated administration groups. For instance, when a user named Smith is specified as a delegated administrator in two different delegated administration groups, Group A and Group B, the delegated administrator Smith may be able to assign a permission set or public group from Group A to the users in Group B.

A delegated administrator may create and edit users in certain set of user roles and associated subordinate roles. A delegated administrator may also reset passwords, lock or unlock users, set quotas, create default opportunity teams, create personal groups for those users, create public groups and manage membership in specified public groups, and log in as users who have granted login access to their administrator.

A delegated administrator may be able to assign any assignable profiles to the users in roles that they manage based on a set of profiles that the administrator has specified for the delegated administrator. For instance, a profile may be used to define how a user can access information and what a user can do within an application.

A delegated administrator may be able to assign or un-assign any assignable permission sets to the users in roles and subordinate roles that they manage. A permission set is a container of permissions that may be assigned to a user in order to grant the user access to a variety of resources in the organization. For instance, the resources may include objects, fields, pages, programmatic functions, identity service providers, and general functions. A delegated administrator may not modify permission sets. A delegated administrator may only assign or remove permission sets for the users in a group associated with that delegated administrator. It may be noted that a delegated administrator may not assign a permission that enables a user to modify all data. Further, a delegated administrator who does not have the permission to modify all data may not manage a user who has the permission to modify all data.

A delegated administrator may also be able to manage a set of custom objects including the ability to customize fields in those objects. The custom objects include those objects delegated by the administrator to a delegated administration group that the delegated administrator is a member of. For instance, a custom object may be an object that is created to store information that is unique to an organization. A delegated administrator may customize nearly every aspect of the custom object. For instance, after a custom object is created, a delegated administrator may create custom fields, associate the custom object with other records and display the custom object data in custom related lists, track tasks and events for custom object records, build page layouts, customize the search results and the custom object fields that display in them, and create a custom tab for the custom object. However, a delegated administrator may not create or modify relationships on the object or set organization-wide sharing defaults. It may be noted that this applies only to the custom objects. A delegated administrator may not be able to modify any fields in standard objects.

In general, a delegated administrator can work as an administrator for a particular group of users and their subordinates based on their roles together with certain specified profiles, custom objects and permission sets. A delegated administrator may serve as a first level of support when users in a specific user group need support, while the administrator may serve as a second level of support. Having a delegated administrator to perform limited administration tasks enables the administrator to focus on other administration tasks.

For some implementations, a delegated administrator is also granted the customize application permission enabling the delegated administrator to perform tasks and to access features. An example of the permissions included in the customize application permission is described above. For some implementations, subsets of the permissions in the customize application permission may generated and stored as different customize application containers. One or more of the customize application containers instead of the customize application permission may be granted to a delegated administrator. For example, when the administrator enables the delegated administrator to manage two different custom objects, the administrator may associate one customize application container with one custom object and another customize application container with another object. Using the customize application containers may enable the administrator to have more flexibility and control in delegating the administration duties. It may be noted that although the following discussions include references to an administrator, the discussions may also be applicable to a delegated administrator when appropriate.

Various implementations described or referenced herein are directed to different systems, apparatus, methods and computer-readable storage media for providing permissions that give access to computing resources such as data objects, components, and other entities of a system. In some examples, permissions can be managed and assigned via permission sets. Multiple permission sets may be assigned to a user of a system in order to grant access to a variety of resources. In some implementations, a permission set is structured as a container of permissions. The permission set can be assigned directly to a user, with the permissions layered to provide one or more rights needed to access computing resources in an on-demand database service environment including, but not exclusive of: objects, fields, pages, programmatic functions, identity service providers, and general functions.

For instance, users and permission sets may be assigned to each other based upon criteria. The assignments of users and permission sets may be stored in one or more databases of an on-demand database service environment. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some on-demand database service environments, an Application Programming Interface (API) is configured to expose a collection of permissions and their assignments to users through appropriate network-based services and architectures, for instance, using Simple Object Access Protocol (SOAP) Web Service and Representational State Transfer (REST) APIs.

Some implementations of the disclosed techniques can allow developers to create advanced administrative tooling to reduce administrative time managing a user's rights, enable advanced reporting of a user's permissions through their permission set assignments, and allow developers to integrate master entitlement systems like Active Directory or Lightweight Directory Access Protocol (LDAP) services in an on-demand database service environment for the purpose of synchronizing a user's rights across multiple services and applications.

In some implementations, an administrator may specify permission sets when setting up a delegated administration group. Once the permission sets are specified for a delegated administration group, the delegated administrators belonging to the delegated administration group may assign and un-assign those permission sets from the users that they manage. In some implementations, a delegated administrator may not be able to modify the permission sets assigned by the administrator.

In some implementations, a permission set may be presented to an administrator as a container of permissions. However, each permission can reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes.

Permission sets have licensing implications, because the specific permissions granted to a user may be limited by the user's license. For example, an employee's user license may not permit the employee to access manager data objects. Consequently, the employee user should not be assigned a permission set that includes permission to access manager data objects. One way to ensure that permission sets are not assigned to users in a way that violates their user licenses is to associate every permission set that is created with a user license, and to validate upon creation of the permission set that none of the permissions in the permission set violate the user license associated with the permission set. However, in situations where an administrator wishes to grant a single permission to multiple users with different user licenses, this system may require an administrator to create multiple permission sets having the same single permission in order to grant that permission to multiple users with different user licenses. As an example, if there are five different user license types, and an administrator wishes to assign an "API Enabled" permission to all users, the administrator would need to create five permission sets, each containing only the "API Enabled" permission, and each corresponding with one of the five different user licenses. The implementations described herein reduce this administrative overhead by creating only one "API Enabled" permission set, which may be assigned to users having different user license type.

As another example, an independent software vendor wishes to publish a custom application consisting of custom objects, fields, classes, and pages, to be accessed by all users of an organization in a multitenant database environment. The vendor may wish to create permission sets that grant access to the custom objects, fields, classes, and pages of the custom application to all users. The implementations described herein allow the vendor to create a single permission set that may be assigned to any license type to grant access to the vendor's application, making it easier for independent software vendors to install permissions with their custom applications, rather than creating one permission set for each license that may be available in an organization.

In some implementations described herein, a permission set may be created by an administrator without being associated with a user license. Validation of the permission set may not occur until the permission set is assigned to a user, at which point the server identifies the user license associated with the user and determines whether the permission set being assigned to the user violates the user license associated with the user. For example, a single "API Enabled" permission set may be created. This permission set may then be assigned to users of all license types, because all of the license types allow the "API Enabled" permission to be assigned to the users. This obviates the need to create an "API Enabled" permission set for each user license type.

In some implementations, when a permission set is modified to include additional permissions, the modification may be validated by the server, because the additional permissions may violate a user license of a user to whom the permission set is assigned. When the server receives a request to add one or more permissions to a permission set, the server identifies the users to whom the permission set is currently assigned, identifies the user licenses associated with those users, and then determines whether the additional permissions will violate any of the user licenses.

In addition to user licenses, other constraints may be implemented to determine what permissions a user may possess. User constraints may take the form of any logical grouping of metadata that has access controls. For example, other user constraint forms may include an online community, an application, a line of business, or an independent software vendor application. Having these flexible user constraints allows an administrator of a system to grant access to various system resources based on the needs of the business.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

FIG. 1 shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1 (and in more detail in FIG. 2) user systems 12 might interact via a network 14 with an on-demand database service, which is implemented in the example of FIG. 1 as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 2:
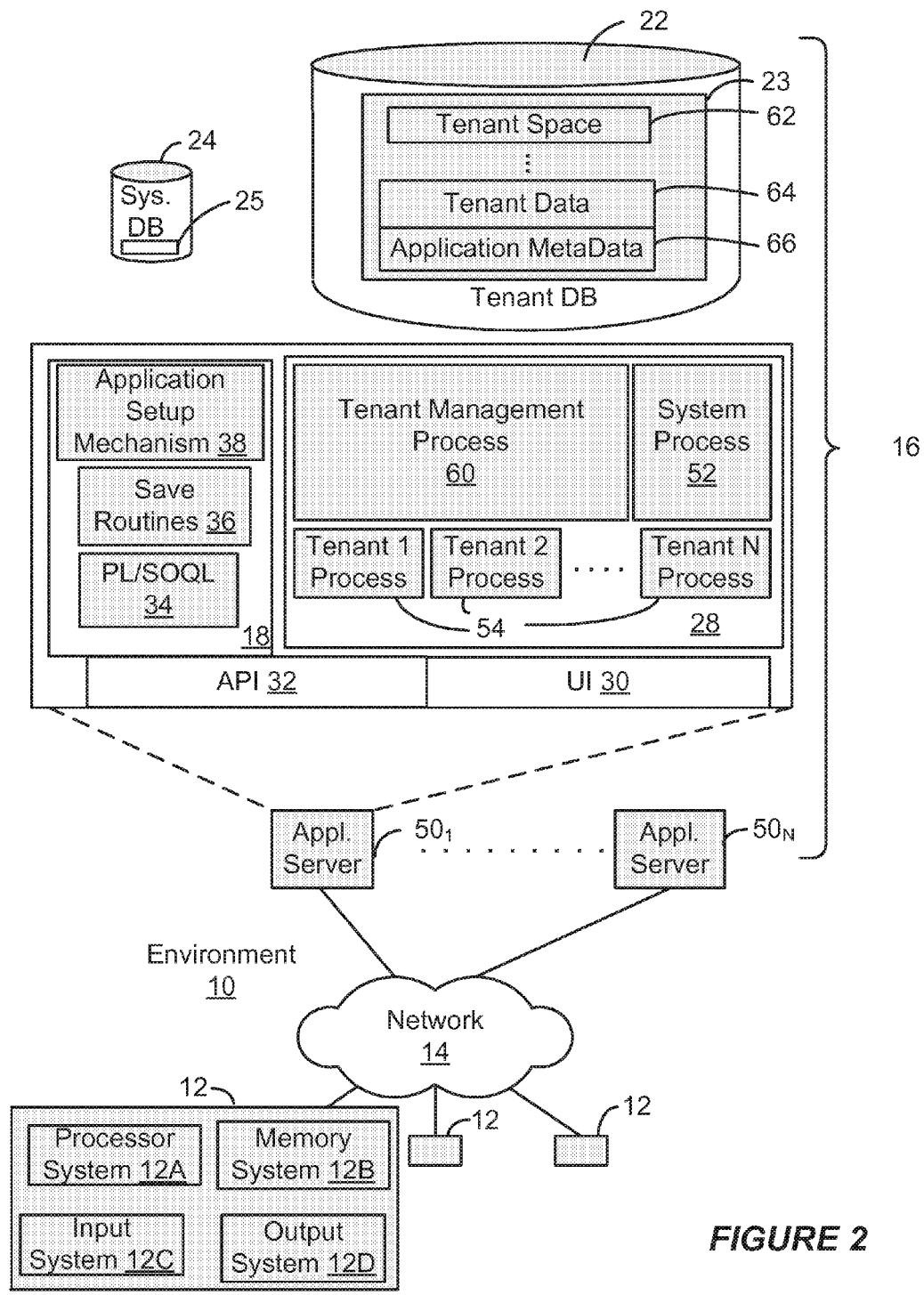
FIG. 2 shows a block diagram of an example of some implementations of elements of FIG. 1 and various possible interconnections between these elements.

One arrangement for elements of system 16 is shown in FIGS. 1 and 2, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, tablet, smartphone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 2 shows a block diagram of an example of some implementations of elements of FIG. 1 and various possible interconnections between these elements. That is, FIG. 2 also illustrates environment 10. However, in FIG. 2 elements of system 16 and various interconnections in some implementations are further illustrated. FIG. 2 shows that user system 12 may include processor system 12A, memory system 12B, input system 12C, and output system 12D. FIG. 11B shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 50.sub.1-50.sub.N, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server 50.sub.1 might be coupled via the network 14 (e.g., the Internet), another application server 50.sub.N-1 might be coupled via a direct network link, and another application server 50.sub.N might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 3A:
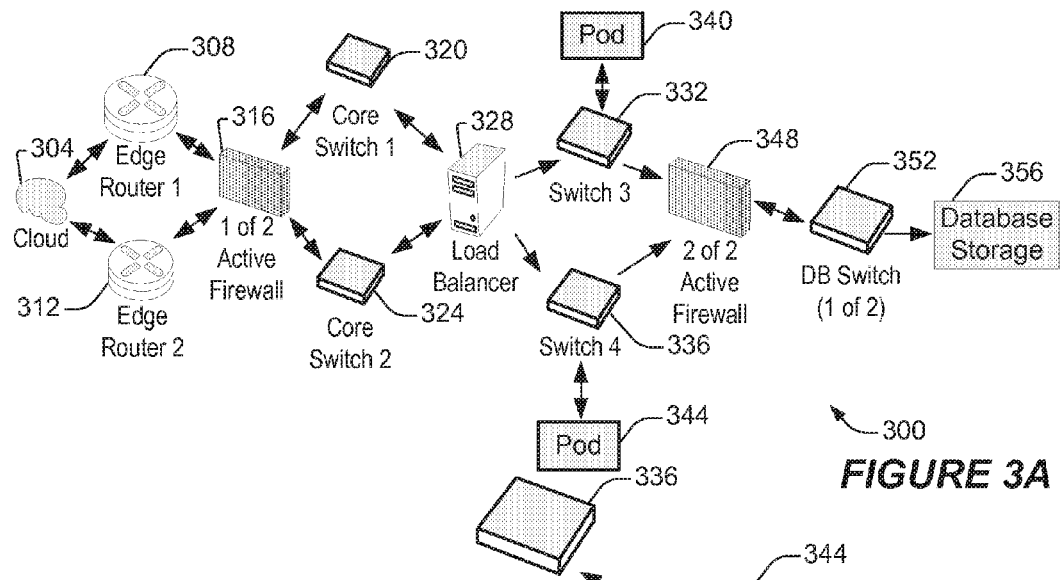
FIG. 3A shows a system diagram illustrating an example of architectural components of an on-demand database service environment 300, in accordance with some implementations.

FIG. 3A shows a system diagram illustrating an example of architectural components of an on-demand database service environment 300 according to some implementations. A client machine located in the cloud 304, generally referring to one or more networks in combination, as described herein, may communicate with the on-demand database service environment via one or more edge routers 308 and 312. A client machine can be any of the examples of user systems 3 described above. The edge routers may communicate with one or more core switches 320 and 324 via firewall 316. The core switches may communicate with a load balancer 328, which may distribute server load over different pods, such as the pods 340 and 344. The pods 340 and 344, which may each include one or more servers and/or other computing resources, may perform data processing and other operations used to provide on-demand services. Communication with the pods may be conducted via pod switches 332 and 336. Components of the on-demand database service environment may communicate with a database storage 356 via a database firewall 348 and a database switch 352.

Figure 3B:
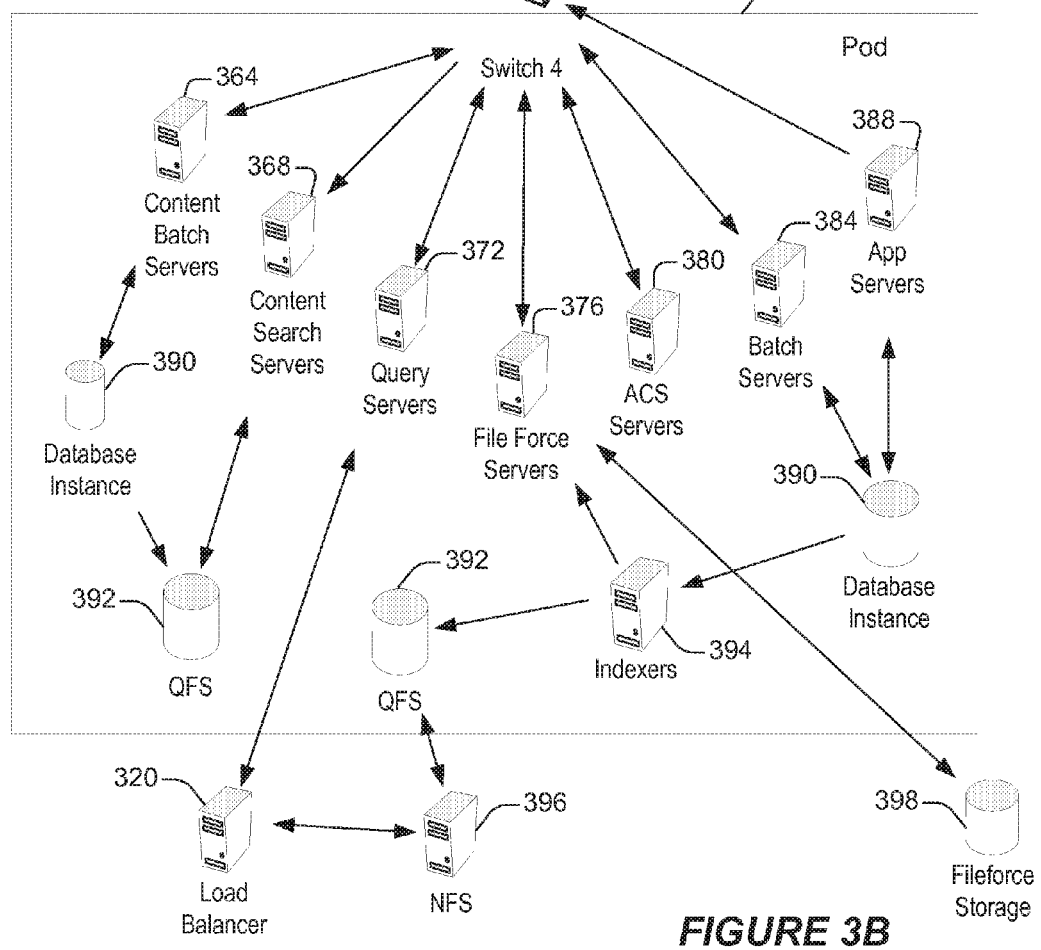
FIG. 3B shows a system diagram further illustrating an example of architectural components of an on-demand database service environment, in accordance with some implementations.

As shown in FIGS. 3A and 3B, accessing an on-demand database service environment may involve communications transmitted among a variety of different hardware and/or software components. Further, the on-demand database service environment 300 is a simplified representation of an actual on-demand database service environment. For example, while only one or two devices of each type are shown in FIGS. 3A and 3B, some implementations of an on-demand database service environment may include anywhere from one to many devices of each type. Also, the on-demand database service environment need not include each device shown in FIGS. 3A and 3B, or may include additional devices not shown in FIGS. 3A and 3B.

Moreover, one or more of the devices in the on-demand database service environment 300 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 304 is intended to refer to a data network or plurality of data networks, often including the Internet. Client machines located in the cloud 304 may communicate with the on-demand database service environment to access services provided by the on-demand database service environment. For example, client machines may access the on-demand database service environment to retrieve, store, edit, and/or process information.

In some implementations, the edge routers 308 and 312 route packets between the cloud 304 and other components of the on-demand database service environment 300. The edge routers 308 and 312 may employ the Border Gateway Protocol (BGP). The BGP is the core routing protocol of the Internet. The edge routers 308 and 312 may maintain a table of IP networks or 'prefixes', which designate network reachability among autonomous systems on the Internet.

In one or more implementations, the firewall 316 may protect the inner components of the on-demand database service environment 300 from Internet traffic. The firewall 316 may block, permit, or deny access to the inner components of the on-demand database service environment 300 based upon a set of rules and other criteria. The firewall 316 may act as one or more of a packet filter, an application gateway, a stateful filter, a proxy server, or any other type of firewall.

In some implementations, the core switches 320 and 324 are high-capacity switches that transfer packets within the on-demand database service environment 300. The core switches 320 and 324 may be configured as network bridges that quickly route data between different components within the on-demand database service environment. In some implementations, the use of two or more core switches 320 and 324 may provide redundancy and/or reduced latency.

In some implementations, the pods 340 and 344 may perform the core data processing and service functions provided by the on-demand database service environment. Each pod may include various types of hardware and/or software computing resources. An example of the pod architecture is discussed in greater detail with reference to FIG. 3B.

In some implementations, communication between the pods 340 and 344 may be conducted via the pod switches 332 and 336. The pod switches 332 and 336 may facilitate communication between the pods 340 and 344 and client machines located in the cloud 304, for example via core switches 320 and 324. Also, the pod switches 332 and 336 may facilitate communication between the pods 340 and 344 and the database storage 356.

In some implementations, the load balancer 328 may distribute workload between the pods 340 and 344. Balancing the on-demand service requests between the pods may assist in improving the use of resources, increasing throughput, reducing response times, and/or reducing overhead. The load balancer 328 may include multilayer switches to analyze and forward traffic.

In some implementations, access to the database storage 356 may be guarded by a database firewall 348. The database firewall 348 may act as a computer application firewall operating at the database application layer of a protocol stack. The database firewall 348 may protect the database storage 356 from application attacks such as structure query language (SQL) injection, database rootkits, and unauthorized information disclosure.

In some implementations, the database firewall 348 may include a host using one or more forms of reverse proxy services to proxy traffic before passing it to a gateway router. The database firewall 348 may inspect the contents of database traffic and block certain content or database requests. The database firewall 348 may work on the SQL application level atop the TCP/IP stack, managing applications' connection to the database or SQL management interfaces as well as intercepting and enforcing packets traveling to or from a database network or application interface.

In some implementations, communication with the database storage 356 may be conducted via the database switch 352. The multi-tenant database storage 356 may include more than one hardware and/or software components for handling database queries. Accordingly, the database switch 352 may direct database queries transmitted by other components of the on-demand database service environment (e.g., the pods 340 and 344) to the correct components within the database storage 356.

In some implementations, the database storage 356 is an on-demand database system shared by many different organizations. The on-demand database system may employ a multi-tenant approach, a virtualized approach, or any other type of database approach. An on-demand database system is discussed in greater detail with reference to FIGS. 1 and 2.

FIG. 3B shows a system diagram further illustrating an example of architectural components of an on-demand database service environment according to some implementations. The pod 344 may be used to render services to a user of the on-demand database service environment 300. In some implementations, each pod may include a variety of servers and/or other systems. The pod 344 includes one or more content batch servers 364, content search servers 368, query servers 382, file force servers 386, access control system (ACS) servers 380, batch servers 384, and app servers 388. Also, the pod 344 includes database instances 390, quick file systems (QFS) 392, and indexers 394. In one or more implementations, some or all communication between the servers in the pod 344 may be transmitted via the switch 336.

In some implementations, the app servers 388 may include a hardware and/or software framework dedicated to the execution of procedures (e.g., programs, routines, scripts) for supporting the construction of applications provided by the on-demand database service environment 300 via the pod 344. In some implementations, the hardware and/or software framework of an app server 388 is configured to execute operations of the services described herein, including performance of the blocks of methods described with reference to FIGS. 12-14. In alternative implementations, two or more app servers 388 may be included and cooperate to perform such methods, or one or more other servers described herein can be configured to perform the disclosed methods.

The content batch servers 364 may handle requests internal to the pod. These requests may be long-running and/or not tied to a particular customer. For example, the content batch servers 364 may handle requests related to log mining, cleanup work, and maintenance tasks.

The content search servers 368 may provide query and indexer functions. For example, the functions provided by the content search servers 368 may allow users to search through content stored in the on-demand database service environment.

The file force servers 386 may manage requests for information stored in the Fileforce storage 398. The Fileforce storage 398 may store information such as documents, images, and basic large objects (BLOBs). By managing requests for information using the file force servers 386, the image footprint on the database may be reduced.

The query servers 382 may be used to retrieve information from one or more file systems. For example, the query system 382 may receive requests for information from the app servers 388 and then transmit information queries to the NFS 396 located outside the pod.

The pod 344 may share a database instance 390 configured as a multi-tenant environment in which different organizations share access to the same database. Additionally, services rendered by the pod 344 may call upon various hardware and/or software resources. In some implementations, the ACS servers 380 may control access to data, hardware resources, or software resources.

In some implementations, the batch servers 384 may process batch jobs, which are used to run tasks at specified times. Thus, the batch servers 384 may transmit instructions to other servers, such as the app servers 388, to trigger the batch jobs.

In some implementations, the QFS 392 may be an open source file system available from Sun Microsystems® of Santa Clara, Calif. The QFS may serve as a rapid-access file system for storing and accessing information available within the pod 344. The QFS 392 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 368 and/or indexers 394 to identify, retrieve, move, and/or update data stored in the network file systems 396 and/or other storage systems.

In some implementations, one or more query servers 382 may communicate with the NFS 396 to retrieve and/or update information stored outside of the pod 344. The NFS 396 may allow servers located in the pod 344 to access information to access files over a network in a manner similar to how local storage is accessed.

In some implementations, queries from the query servers 322 may be transmitted to the NFS 396 via the load balancer 328, which may distribute resource requests over various resources available in the on-demand database service environment. The NFS 396 may also communicate with the QFS 392 to update the information stored on the NFS 396 and/or to provide information to the QFS 392 for use by servers located within the pod 344.

In some implementations, the pod may include one or more database instances 390. The database instance 390 may transmit information to the QFS 392. When information is transmitted to the QFS, it may be available for use by servers within the pod 344 without using an additional database call.

In some implementations, database information may be transmitted to the indexer 394. Indexer 394 may provide an index of information available in the database 390 and/or QFS 392. The index information may be provided to file force servers 386 and/or the QFS 392.

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an email to certain people, but this is onerous and the salesperson might not email all of the people who need to know or want to know. Accordingly, some implementations of the disclosed techniques can inform others (e.g., co-workers) who want to know about an update to a record automatically.

The tracking and reporting of updates to a record stored in a database system can be facilitated with a multi-tenant database system 16, e.g., by one or more processors configured to receive or retrieve information, process the information, store results, and transmit the results. In other implementations, the tracking and reporting of updates to a record may be implemented at least partially with a single tenant database system.

Figure 4A:
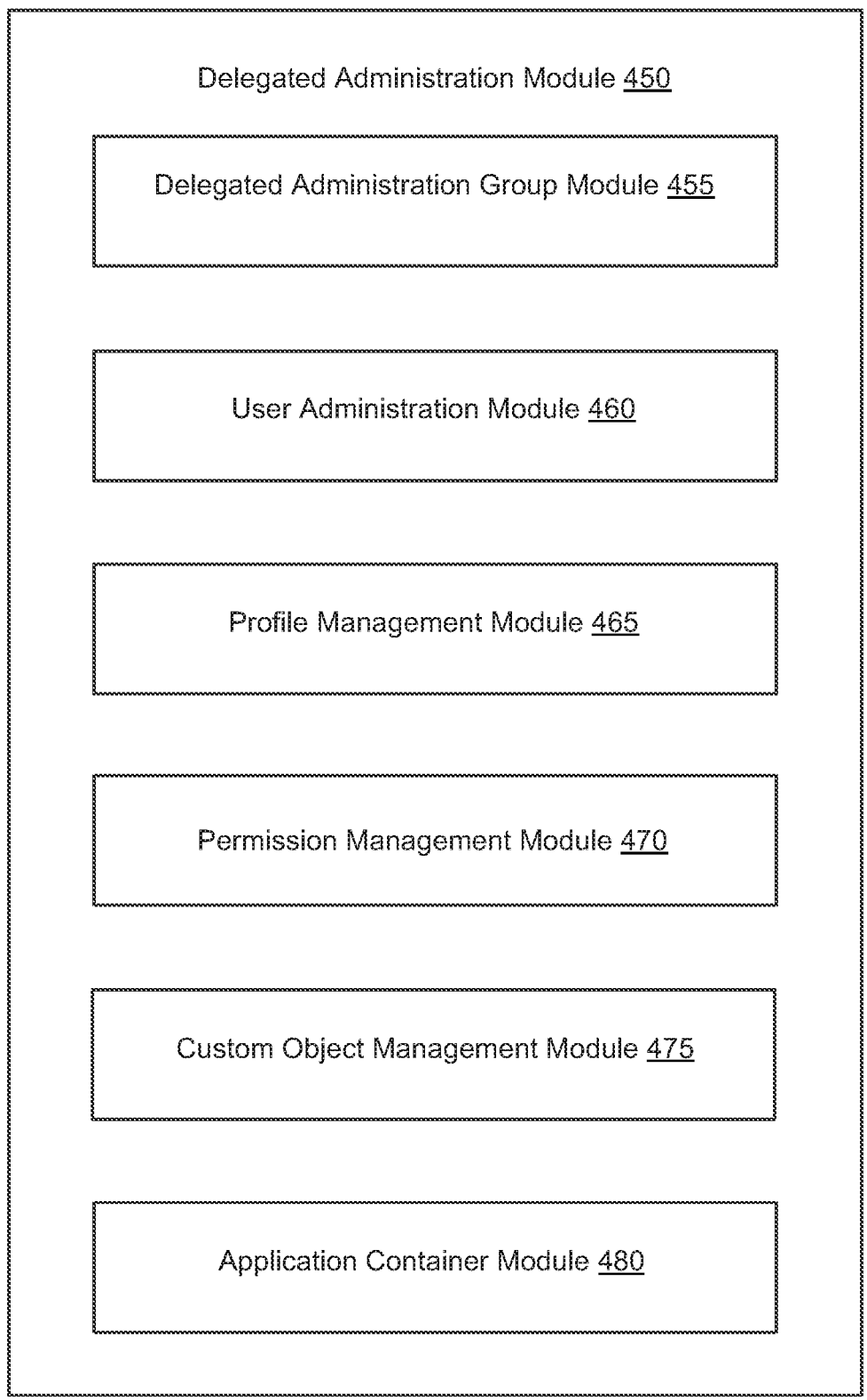
FIG. 4A shows a block diagram illustrating an example of modules that may be used to delegate administration rights using customize application containers, in accordance with some implementations.

FIG. 4A shows an example of a delegated administration module that enables establishing delegated administration, in accordance with some embodiments. Delegated administration module 450 may be associated with a computing system that is used by an administrator. The delegated administration module 450 may be used by the administrator to delegate administration duties to others so that the administrator may, for example, be able to spend time on more important tasks. The delegated administration module 450 may be associated with the multi-tenant database system 16 shown in FIG. 1. The delegated administration module 450 may be activated based on an administrator selecting an option via an administrator user interface. The activation may include receiving a request generated based on the action of the administrator.

The delegated administration module 450 may include a delegated administration group module 455 configured to enable an administrator to create one or more groups of delegated administrators. A user interface associated with the delegated administration group module 455 may be displayed to enable managing the delegated administration groups. This may include displaying options to create a new delegated administration group or to modify information about an existing delegated administration group. The user interface may be configured to display information about the administrator that creates and/or edits a delegated administration group. Information such as the time and date when those events occur may also be displayed. Each delegated administration group may be associated with a group name (e.g., marketing group). When a group name is selected, the user interface of the delegated administration group 455 may display detail information about that particular group, including displaying information about existing delegated administrators such as, for instance, names of the delegated administrators. Options may be displayed to enable creating, editing and deleting a delegated administrator in a delegated administration group.

The delegated administration module 450 may include a user administration module 460 configured to enable an administrator to specify the roles of users for which a delegated administrator may be responsible. The users may include those who are at the roles specified by the administrator as well as the users who are at the subordinating roles according to a role hierarchy in an organization. For instance, the delegated administrator may be responsible for all users in the marketing group from the head of the marketing group down to all of the subordinates in the marketing group hierarchy. For instance, when a new employee is hired into the marking group, a delegated administrator responsible for the marketing group is allowed to create user information for the new employee. However, the delegated administrator for the marketing group is not involved when a new employee is hired into a human resource group, unless that delegated administrator is also a delegated administrator in the human resource group. The user interface associated with the user administration module 460 may display options to enable an administrator to add a role and to remove a role. The user interface may display information about the administrator who adds a role. Information such as the time and date when a role is added may also be displayed.

The delegated administration module 450 may include a profile management module 465 configured to enable an administrator to assign profiles to a delegated administrator. The delegated administrator may then able to assign these profiles to the users that the delegated administrator may be responsible for. These profiles may be referred to as assignable profiles. When a delegated administrator creates or adds a new user, the delegated administrator may assign a profile to that user to define how the user can access objects and data in the organization. A user interface associated with the profile management module 465 may display a list of profiles added by an administrator of a delegated administration group. The user interface may display an option to add a profile to the profile list and an option to remove a profile from the profile list. The user interface may display information about the administrator who adds a profile to the profile list. Information such as the time and date when a profile is added may also be displayed.

The delegated administration module 450 may include a permission management module 470 configured to enable an administrator to assign permission sets to a delegated administrator. The delegated administrator may then able to assign the permission set (also referred to as assignable permission set) to the users that the delegated administrator may be responsible for. When a delegated administrator creates or adds a new user, the delegated administrator may assign a permission set to that user. A permission set may be used to determine the access right of a user relative to, for instance, objects, fields, pages, etc. A delegated administrator may also un-assign a permission set. A user interface associated with the permission management module 470 may display a list of permission set added by an administrator of a delegated administration group. The user interface may display an option to add a permission set to the list of permission sets and an option to remove a permission set from the list of permission sets. The user interface may display information about the administrator who adds a permission set to the list of permission sets. Information such as the time and date when a permission set is added may also be displayed. As mentioned, a delegated administrator may not be able to modify any permission set in the list of permission sets.

The delegated administration module 450 may include a custom object management module 475 configured to enable an administrator to assign custom objects to a delegated administrator. A custom object may be created by an administrator. Once added to a delegated administration group, a delegated administrator in the delegated administration group may then be able to assign the custom objects to the users that the delegated administrator may be responsible for. For some implementations, the delegated administrator may be able to modify fields in the custom objects. A user interface associated with the custom object management module 475 may display a list of custom objects added by an administrator of a delegated administration group. The user interface may display an option to add a custom object to the list of custom objects and an option to remove a custom object from the list of custom objects. The user interface may display information about the administrator who adds a custom object to the list of custom objects. Information such as the time and date when a custom object is added may also be displayed.

The delegated administration module 450 may include a customized application container module 480 configured to enable an administrator to generate one or more containers that include subsets of permissions in the custom application permission. For example, a customized application container may include the only the following permissions from the customized application permission: edit messages and custom links; modify standard picklist values; create, edit, and delete custom fields; create, edit, and delete page layouts; set field-level security; create, edit, and delete custom links. The operations that enable generating the customized application containers may be performed using a wrapper class which is a collection of two or more objects, with an object in this context referring to a permission in the customized application permission. Other techniques (e.g., namespacing) may also be used to generate a customized application container. A user interface may be provided to enable an administrator to define a customized application container. For example, the user interface may enable an administrator to select and group certain permissions in the customized application permission in a customized application container. Multiple customized application containers may be generated. It may be noted that, although FIG. 4A shows that the delegated administration module 450 includes the modules 455-480 as separate modules, the operations of some or all of the modules 455-480 may be combined. For instance, the operations of the profile management module 465 and the permission management module 470 may be combined into one module.

Figure 4B:
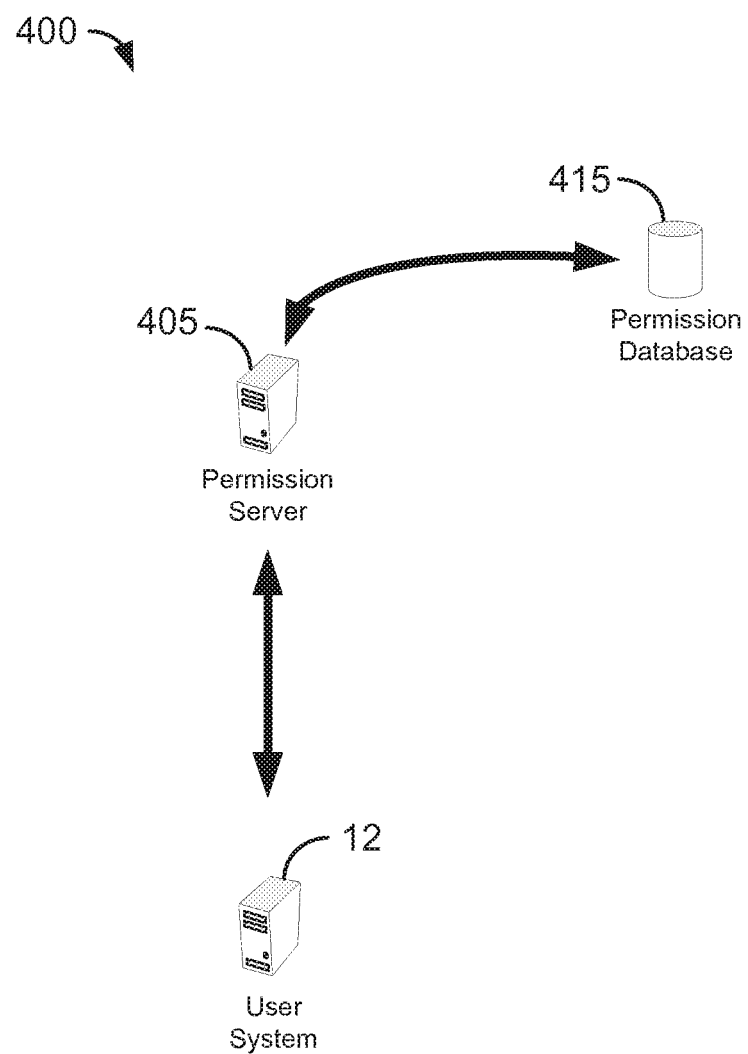
FIG. 4B shows a system diagram illustrating an example of architectural components 400 for assigning permission sets to users, in accordance with some implementations.

FIG. 4B shows a system diagram illustrating an example of architectural components 400 for assigning permission sets to users according to some implementations. Architectural components 400 in FIG. 4B may provide communications to be transmitted among a variety of different hardware and/or software components. For example, architectural components 400 may include user system 12, permission server 405, and permission database 415.

The various components are able to communicate with each other over the Internet or a combination of networks including the Internet. For example, in some implementations, user system 12 may communicate with permission server 405. Permission server 405 may further communicate with permission database 415. Accordingly, permission server 405 may process data received from user system 12, and access, analyze, and/or modify data stored in permission database 415. Permission server 405 may also transmit data from permission database 415 to user system 12.

For example, permission server 405 may receive data regarding criteria, such as a geographic location, a level with an organizational hierarchy, title, an industry, a role, and/or a permission. In some implementations, permission server 405 may query permission database 415 to select a permission set associated with the criteria received from user system 12. Permission server 405 may also identify users associated with the criteria. Accordingly, permission server 405 may assign the selected permission set to the identified users. As such, the users who have been assigned the permission set may obtain access rights to one or more components of a system whose access permissions may be managed by architectural components 400 of FIG. 4. In some implementations, permission server 405 may receive the criteria via an application programming interface (API).

Figure 5:
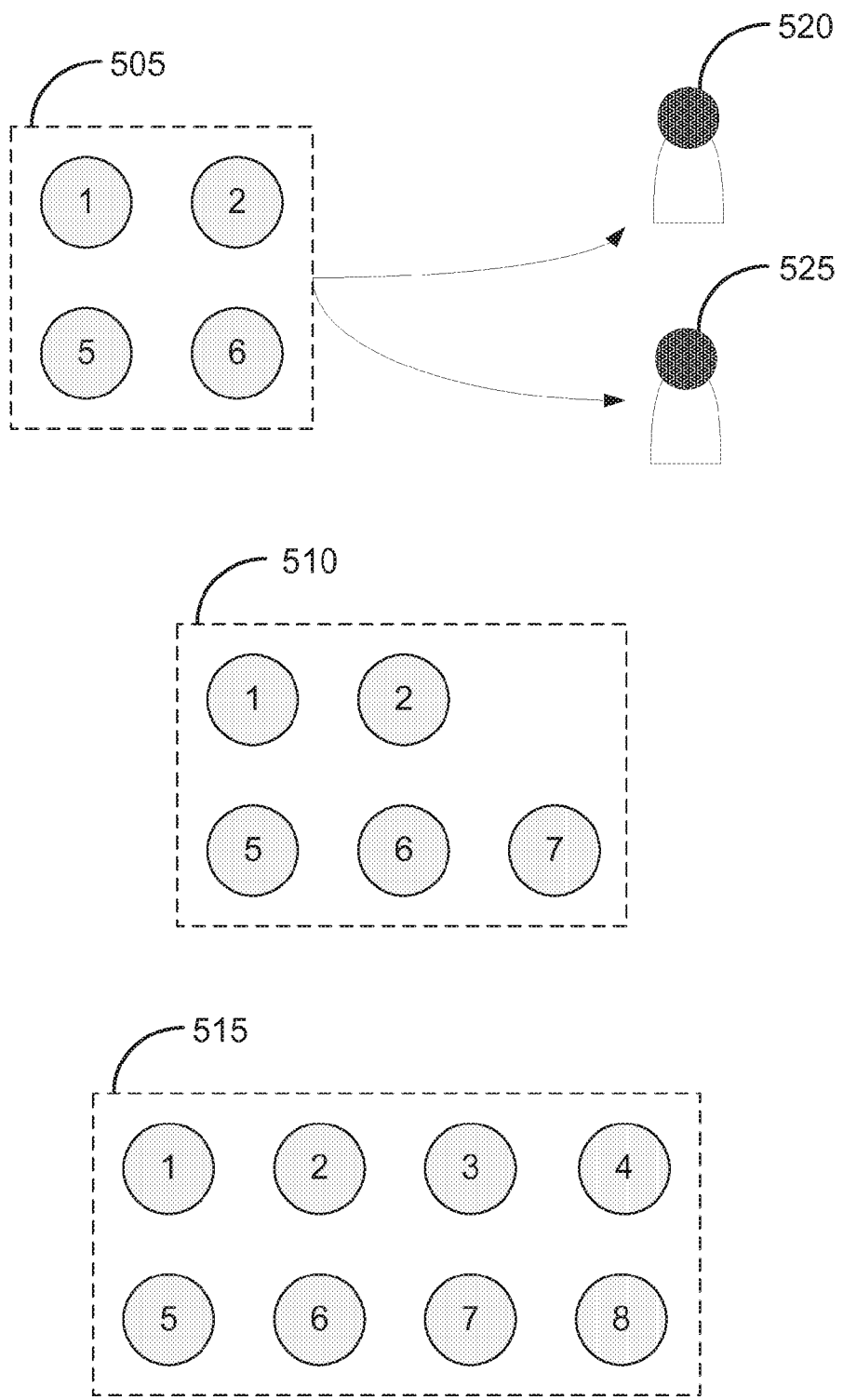
FIG. 5 shows a graphical representation of permissions assignments to users using profiles, in accordance with some implementations.

FIG. 5 shows a graphical representation of permission assignments to users using profiles, in accordance with some implementations. In the implementation of FIG. 5, profiles 505, 510, and 515 include a variety of permissions 1-8. For example, profile 505 includes permissions 1, 2, 5, and 6. Profile 510 includes permissions 1, 2, 5, 6, and 7. Profile 515 includes permissions 1-8. Permissions may include an indication of access, and/or type of access, to a particular computing resource such as a component of a system.

Profiles 505, 510, and 515 may be assigned to a variety of users 520 and 525. For example, profile 505 may be a profile indicating a non-management employee within an organization, and therefore, includes permissions 1, 2, 5, and 6 to provide employees assigned to profile 505 with a level of access to components of a system. Components of a system may include databases, records, fields of records, customer relationship management (CRM) tools, objects, software, etc. For example, permission 1 may provide read access to a field of a database table. Permission 2 may provide access to a certain software program. Permission 5 may provide write capability to a particular field of a database table. Finally, permission 6 may provide access to a particular object. In some implementations, permissions may include create, read, update, and/or delete (CRUD) options. For example, a permission may only include a level of access associated with reading, for example, a field of a record. Another permission may include a level of access associated with reading and updating a field of a record.

Accordingly, users 520 and 525 may be assigned profile 505 and receive permissions 1, 2, 5, and 6. However, if user 525 is promoted to a management position, a system administrator may need to assign a new permission to user 525. For example, permission 7 may provide "view all data" access for a database. Accordingly, the system administrator may need to modify profile 505 to include permission 7. However, by modifying permission 505 with another permission, user 520 will also get permission 7. Therefore, the system administrator may create profile 510, a new type of profile for management employees which includes the same permissions as profile 505 for non-management employees (i.e., permissions 1, 2, 5, and 6) but also includes permission 7. User 525's profile may then be assigned to profile 510. Additionally, the system administrator may wish to receive all permissions for the components of the system. As such, the system administrator may create a third profile, profile 515, which includes all permissions 1-8.

However, across an organization, different users needing different levels of access to different components of the system may create an unwieldy amount of user profiles for system administrators. A user needing an extra access control, such as management employee user 525 needing access to permission 7 (i.e., "view all data"), requires creating a new profile (i.e., profile 510) and subsequently removing the association between the old profile (i.e., profile 505) and user 525 and assigning the new profile even though profile 510 only includes one extra permission than profile 505. As such, the administrative work load for the system administrator may increase with a cumbersome assignment and multitude of profiles.

Figure 6:
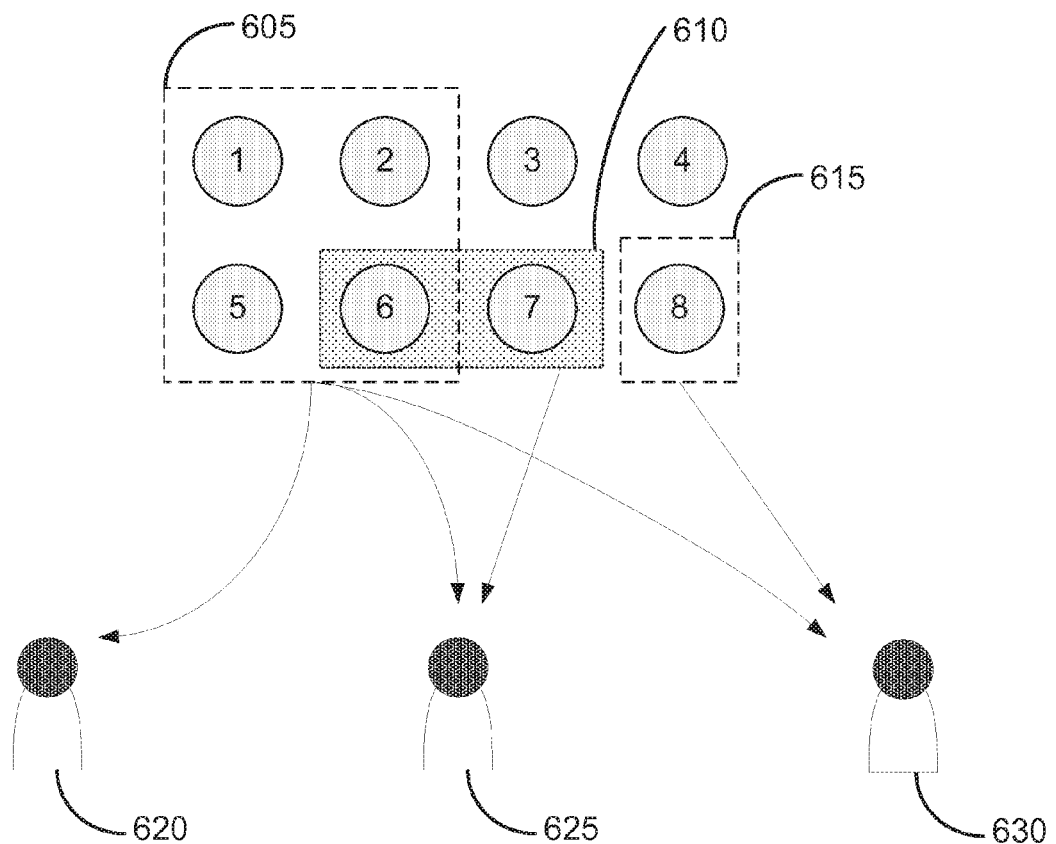
FIG. 6 shows a graphical representation of permissions assignments to users via permission sets, in accordance with some implementations.

FIG. 6 shows a graphical representation of permissions assignments to users via permission sets, in accordance with some implementations. In the implementation of FIG. 6, permission sets 605, 610, and 615 also include a variety of permissions 1-8. For example, permission set 605 includes permissions 1, 2, 5, and 6. Permission set 610 includes permissions 6 and 7. Permission set 615 includes permission 8. The permissions in the permission sets also may include an indication of access, and/or type of access, to particular components or features of a system.

Permission sets 605, 610, and 615 may also be assigned to a variety of users 620, 625, and 630. The permission sets may provide a more modular form of groupings of permissions than profiles. As such, a single user may be assigned multiple permission sets tailored to their particular access needs. For example, permission set 605 is assigned to users 620, 625, and 630. Permission set 610 may be assigned to user 625. Permission set 615 may be assigned to user 630.

In some implementations, users may be assigned both profiles and permission sets. Some permissions may be associated with a profile assigned to a user and some permissions may be associated with permission sets. In an implementation, some permissions may be allowed on both profiles and permission sets. Accordingly, some permissions may be enabled on a user's profile and/or assigned permission sets. Alternatively, some permissions may only be assigned to a user's profile rather than through a permission set, and vice versa. For example, as in FIG. 5, profiles may be associated with non-management employees, management employees, and system administrators. The profiles for the non-management and management employees may include a minimum or base amount of permissions. However, the employees may also be assigned permission sets based on the characteristics or attributes of the employees, as discussed below. As such, permission sets may add additional permissions beyond those found in a profile for a user.

In some implementations, the grouping of permissions into permission sets may be associated with criteria. Criteria may include a geographic location, a level within an organizational hierarchy (e.g., engineer, senior engineer, staff engineer, etc.; manager, senior manager, director, etc.), an industry, a role, level of experience or seniority, and other characteristics of users. For example, permission set 605 may be associated with "engineers." Permissions within permission set 605 (i.e., permissions 1, 2, 5, and 6) may provide a level of access to components needed for engineers. Accordingly, users 620, 625, and 630 may be assigned permission set 605 because the users are engineers.

Permission set 610 may be associated with a geographic location, such as a continent, region, state, city, etc. For example, permission set 610 may be associated with "California." As such, permission set 610 may include permissions allowing a level of access needed for employees within California (e.g., permission to edit data associated with business activity in California). In FIG. 6, user 625 is the only user assigned to permission set 610 because user 625 may be the only user within California, and therefore, the only user provided access to permission 7.

Permission set 615 may be associated with an industry, such as "aerospace." Accordingly, permission set 615 may be assigned to user 630 because user 630 may be an aerospace engineer, and therefore needs the permissions associated with "aerospace" (i.e., permission set 615) and "engineer" (i.e., permission set 605).

Additionally, an assignment of a permission set may be removed or revoked from a user. For example, as discussed above, user 625 may be assigned permission sets 605 (i.e., a permission set associated with "engineers") and 610 (i.e., a permission set associated with "California"). If user 625 transfers from California to Alabama, a system administrator may desire to revoke the assignment of permission set 610 to user 625.

In some implementations, revoking a permission set may not result in the revocation of a particular permission that exists in multiple permission sets. For example, in FIG. 6, permission 6 is associated with permission sets 605 and 610. If permission set 610 is revoked, but permission set 605 is maintained (i.e., not revoked), user 625 may still retain permission 6 because permission set 605 is still assigned and includes permission 6. Therefore, revoking permission set 610 may not necessarily affect the assignment of permission 6 to user 625 due to the assignment of permission set 610.

Figure 7A:
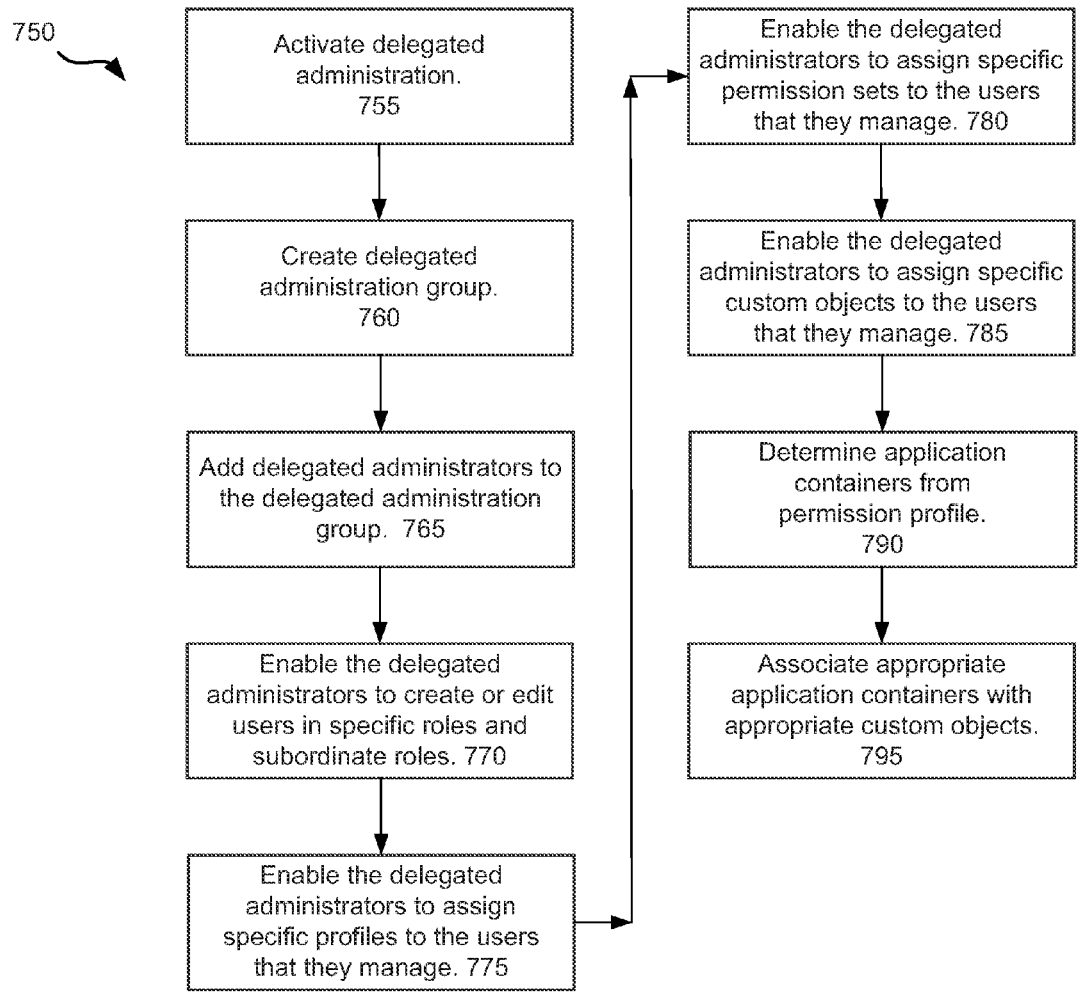
FIG. 7A shows a flowchart of an example of a computer implemented method 750 for creating a delegated administration group and associating customize application containers with custom objects, in accordance with some implementations.

FIG. 7A shows a flowchart of an example of a computer implemented method 750 for creating a delegated administration group and associating customized application containers with custom objects, in accordance with some implementations. Method 750 may start at block 755 where the delegate administration feature is activated. For instance, the activation may be based on executing the delegate administration module 450, shown in FIG. 4A. At block 760, one or more delegated administration groups may be created. For instance, the creation of a delegated administration group may be based on executing the delegated administration group module 455. At block 765, operations may be performed to enable adding one or more delegated administrators to a delegated administration group. At block 770, operations may be performed to enable a delegated administrator to manage users based on roles specified by an administrator. At block 775, operations may be performed to enable a delegated administrator to assign a profile to a user that the delegated administrator is responsible for. At block 780, operations may be performed to enable a delegated administrator to assign a permission set to a user. The permission set may have been earlier defined by an administrator. At block 785, operations may be performed to enable a delegated administrator to assign a custom object to a user. The custom object may have been earlier defined by an administrator. Operations may also be performed to enable the delegated administrator to modify fields of the custom object. Multiple custom objects may be assigned. At block 790, customized application containers may be determined. Each customized application container may include a subset of the permissions included in the customized application permission. At block 795, one or more customized application containers may be associated with appropriate custom objects that the delegated administrator is allowed to manage. It may be noted that the sequence of the steps shown in the flow chart of the method 750 may not necessarily be the exact sequence that needs to be followed. For example, the operations shown in block 790 may be performed as an earlier step.

Figure 7B:
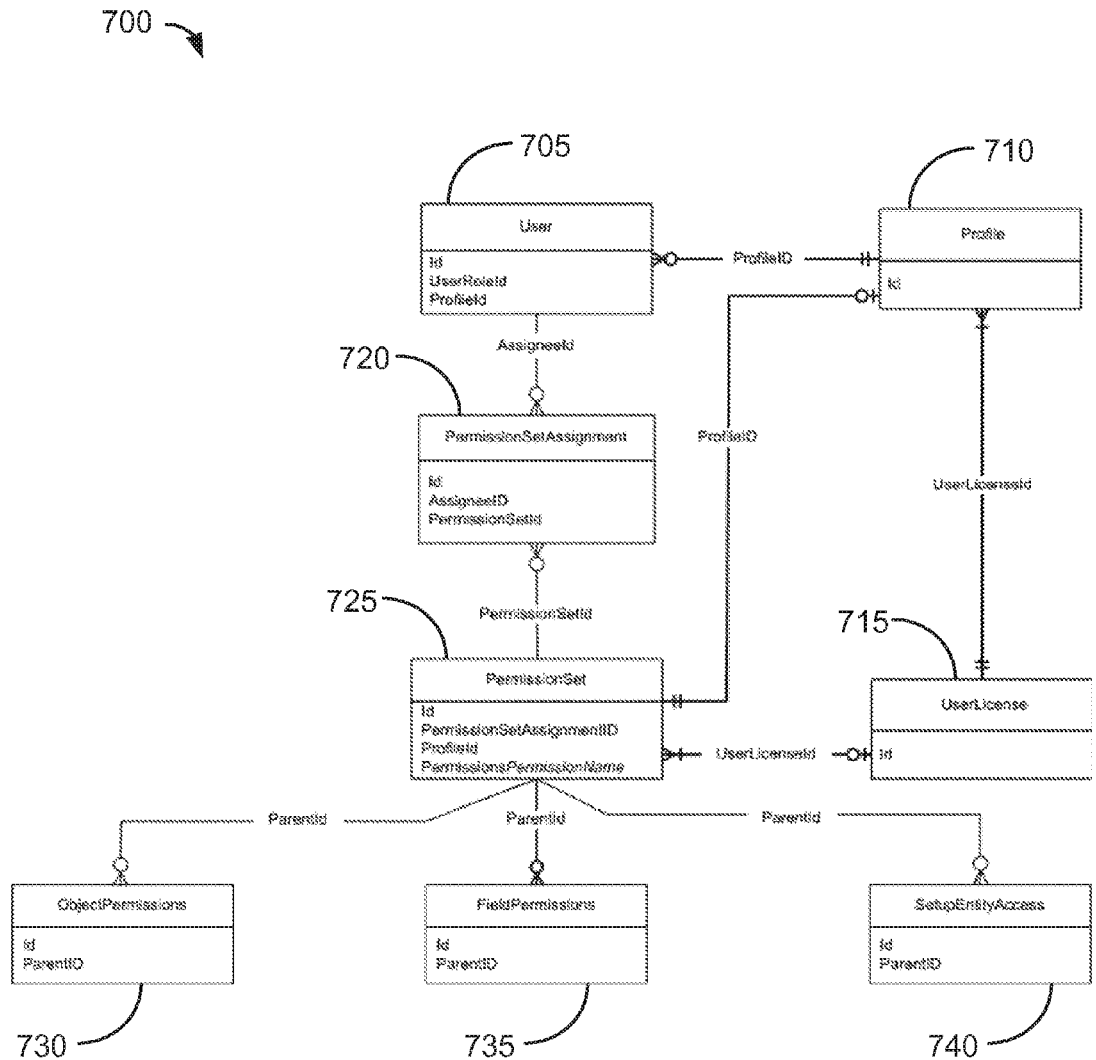
FIG. 7B shows an example of an entity relationship diagram 700 for permission set assignments, in accordance with some implementations.

FIG. 7B shows an example of an entity relationship diagram 700 for permission set assignments in accordance with some implementations. In FIG. 7B, user entity 705 includes an identifier, user role identifier (e.g., a user role in an organization or level of hierarchy within the organization), and profile identifier. Each user entity 705 may be associated with one profile entity 710. However, each profile entity 710 may be assigned to zero or more users.

Profile entity 710 may be associated with a user license entity 715. User license entity 715 may be associated with one or more profile entities. In some implementations, user license entity 715 may include an identifier. Moreover, user license entity 715 may be associated with one or more permission set entities 725. Profile entity 720 may also be associated with a permission set entity 725.

User entity 705 may be associated with zero or more permission set assignment entities 720. In FIG. 7B, permission set assignment entity 720 includes an identifier, an assignee or user identifier, and a permission set identifier. Accordingly, a permission set assignment object may include a user's identifier and an identifier associated with a permission set. In some implementations, every assignment of permission sets to a user may include a permission set assignment object.

Permission set entity 725 includes an identifier, a permission set assignment identifier for an object of the permission set assignment entity 725, a profile identifier, and the permissions within the permission set. Each permission set entity 725 may be associated with zero or more types of permissions. For example, in the entity relationship diagram 700 of FIG. 7B, permission set entity 725 may be associated with zero or more object permissions entity 730, field permissions entity 735, and setup entity access entity 740.

In some implementations, object permissions entity 730 may determine a permission set's CRUD (i.e., create, read, update, and delete) permissions. Field permissions entity 735 may determine a permission set's field level security permissions. Setup entity access 740 may determine a permission set's access to pages (e.g., apex pages), classes, and services. Accordingly, permissions may include a variety of entities used by a system such as objects, fields, applications, or system wide permissions.

Figure 12B:
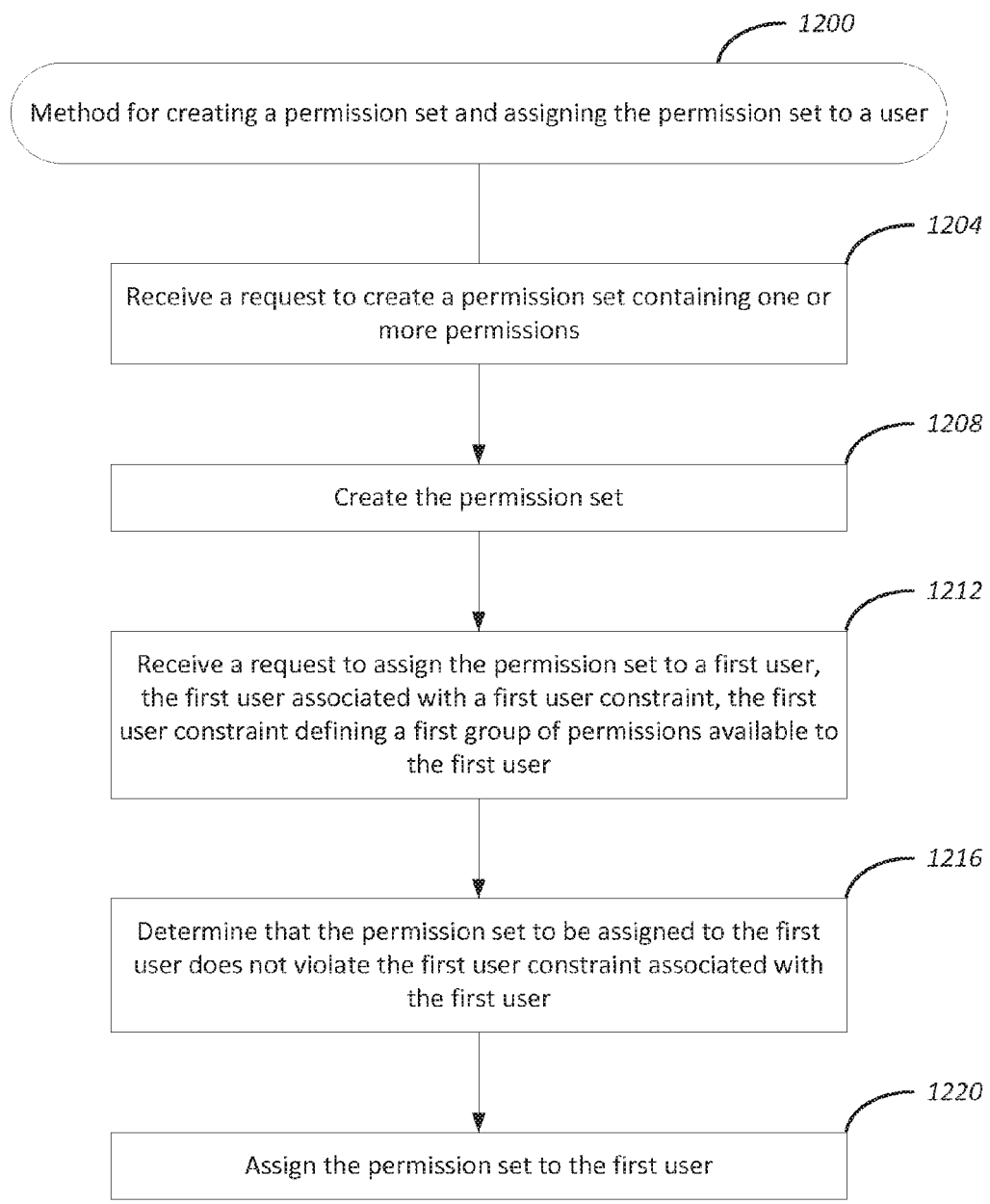
FIG. 12B shows a flowchart of an example of a computer implemented method 1200 for creating a permission set and assigning the permission set to a user, in accordance with some implementations.

FIG. 12B shows a flowchart of an example of a computer implemented method 1200 for creating a permission set and assigning the permission set to a user, in accordance with some implementations.

In FIG. 12B, at block 1204, a server performing method 1200 receives a request to create a permission set. The request includes one or more permissions that are to be included in the permission set. The one or more permissions may be stored in a permission database that the server has access to. In some implementations, the request may come from an administrator user at a computing device.

In FIG. 12B, at block 1208, the server performing method 1200 creates the permission set. In some implementations, one or more records may be stored in the permission database indicating the creation of the permission set with the one or more permissions of the request.

In some implementations, the permission set is associated with a permission set constraint, and the permission set constraint defines a superset of permissions that may be included in any permission sets associated with the permission set constraint.

Figure 8A:
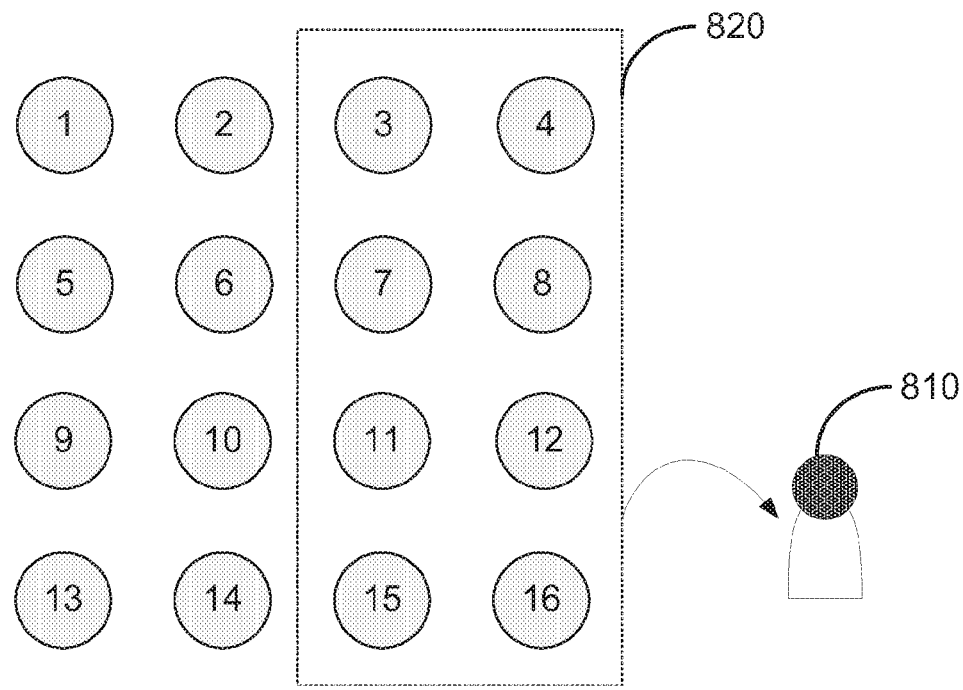
FIG. 8A shows a graphical representation of a user constraint associated with a user, in accordance with some implementations.
Figure 8B:
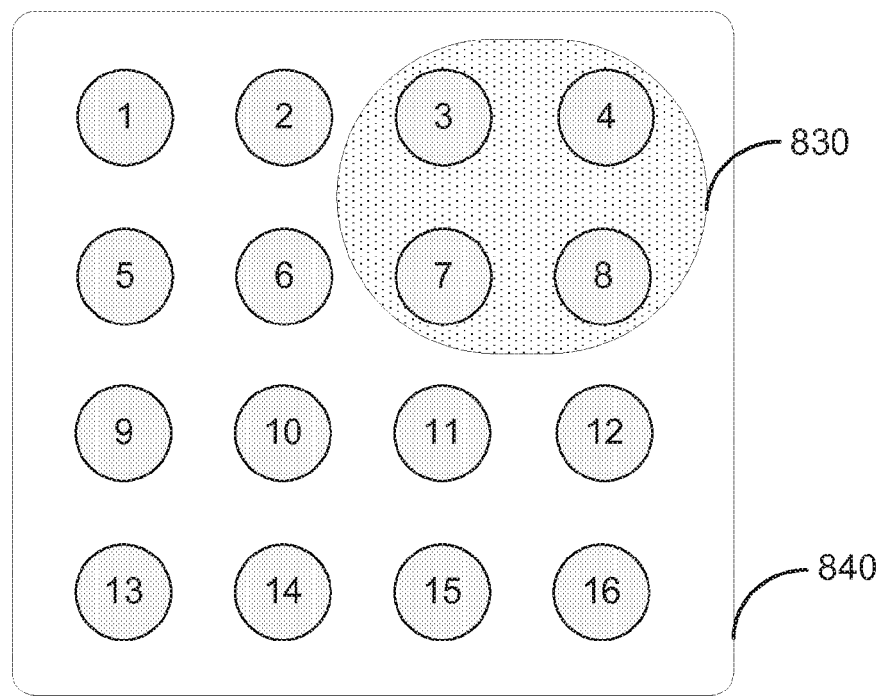
FIG. 8B shows a graphical representation of a permission set and a permission set constraint, in accordance with some implementations.

As an example, FIG. 8B shows a graphical representation of a permission set and a permission set constraint, in accordance with some implementations. In FIG. 8B, a permission set 830 is defined as the group of permissions 3, 4, 7, and 8. In some implementations, a permission set is a group of permissions that may be assigned to one or more users, granting them the permissions of the permission set. The permission set constraint 840 defines a superset of permissions that may be included in a permission set associated with the permission set constraint. For example, the permission set constraint for the permission sets of an organization may be the set of all permissions that the organization is permitted to assign to its users. In some implementations, the permissions included in a permission set must all be included in the permission constraint as well for the permission set to be valid.

In some implementations, the permission set constraint may define the superset of permissions as all of the permissions that are available to a tenant organization in a multi-tenant environment. For example, Acme Corp. may be a tenant organization using the permission server 405 to manage the permissions available to various Acme Corp. employees and customers using the multi-tenant environment. The permission set constraint for Acme Corp. could be all of the permissions related to Acme Corp. users and records, such that a permission set that is assigned to an Acme Corp. user may only include permissions related to Acme Corp. users and records.

In FIG. 12B, at block 1212, the server performing method 1200 receives a request to assign the permission set to a first user. The first user is associated with a first user constraint. The first user constraint defines a first group of permissions that is available to the first user.

In some implementations, the permission set is not associated with the first user constraint when the permission set is created by the server. Rather, the permission set is associated with the first user constraint when the permission set is assigned to the first user.

In some implementations, the first group of permissions defined by the first user constraint includes one or more permissions associated with one or more of: an online social network, an application, a line of business, a software vendor package, and a logical grouping of metadata having access controls. For example, the first user constraint may define a group of permissions that are related to an application provided by a software vendor. The software vendor's application may include records, users, and other data requiring access controls. The software vendor package may further define permission sets to be assigned to users having different roles in the software vendor's application. For example, the software vendor's application may be a paid time off (PTO) time manager, where employees may enter the time that they are taking off from work, where managers may view the time that their employees are taking off from work, and where administrators may view or edit the entries. The software vendor package may include separate prepackaged permission sets for employees, managers, and administrators, and the permission sets may be assigned to users of the multitenant environment in which the software vendor's application has been installed. Because the permission sets do not have to be associated with a user constraint when the permission sets are created, an independent software vendor has the flexibility to define and package permission sets for its applications without having to worry about user constraints that are enforced in the multitenant environment in which the application will be installed.

Figure 15:
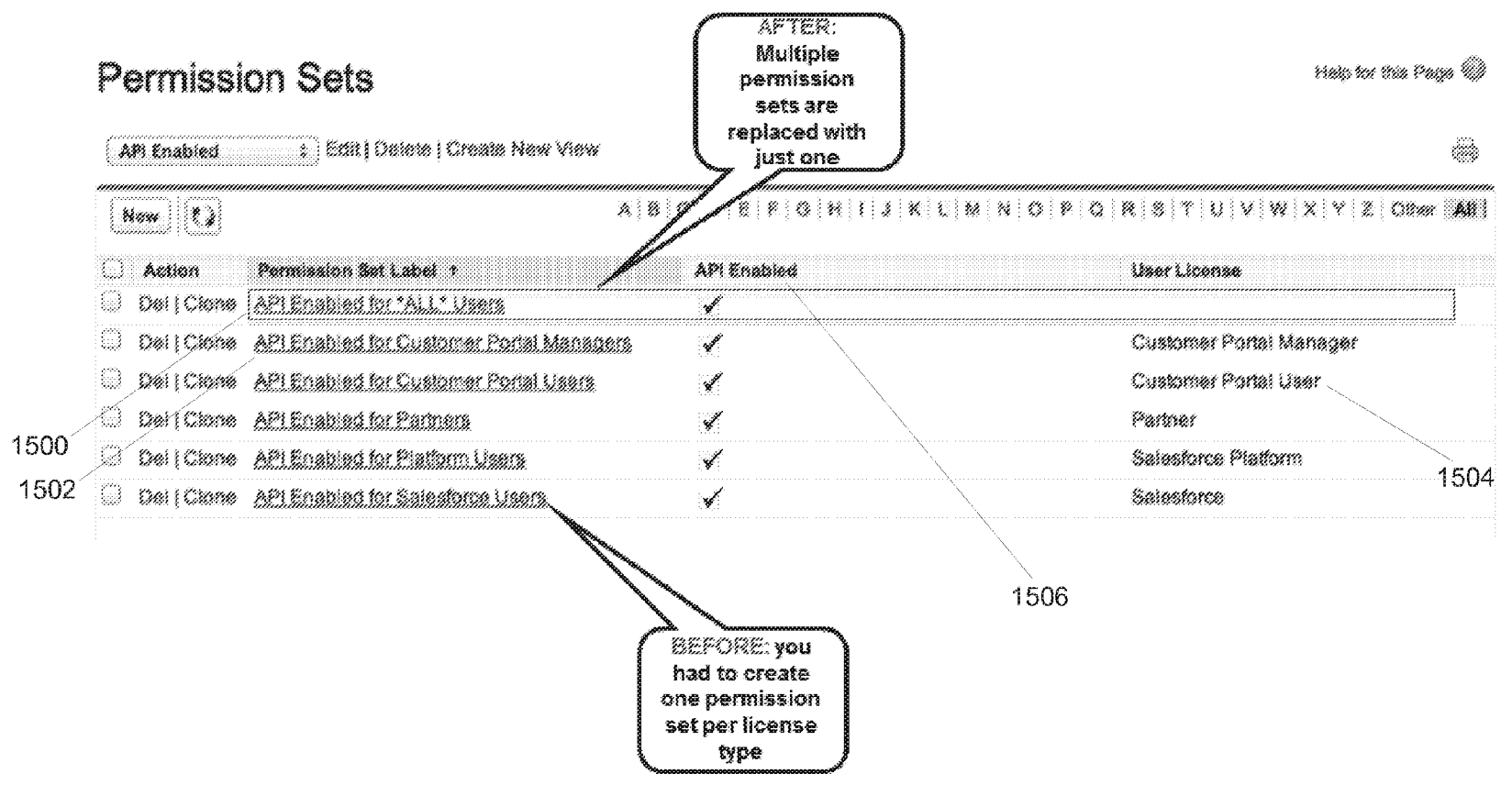

FIG. 15 shows a screenshot of a list of permission sets available to be assigned to users of the multitenant environment. In FIG. 15, the permission set "API Enabled for Customer Portal Managers" 1502 is associated with the "Customer Portal Manager" user license 1504, which defines a group of permissions that a user with the role of "Customer Portal Manager" is permitted to have. An identical permission set is provided for the various user licenses in the list. Each of the permission sets in the list contain only one permission, "API Enabled" 1506, which allows a user with the permission to have access to the application programming interfaces (API). In an environment where a permission set must be associated with a user license, however, it is necessary to create multiple identical permission sets to grant a single permission to users with different roles, because the users with different roles have different user licenses.

The first permission set, "API Enabled for *ALL* Users" 1500, however, is not associated with any user constraint. Consequently, this permission set may replace the other five redundant permission sets, because it may be assigned to any user with any user license, subject to the validation procedure that occurs upon assignment of the permission set to a user.

Figure 16:
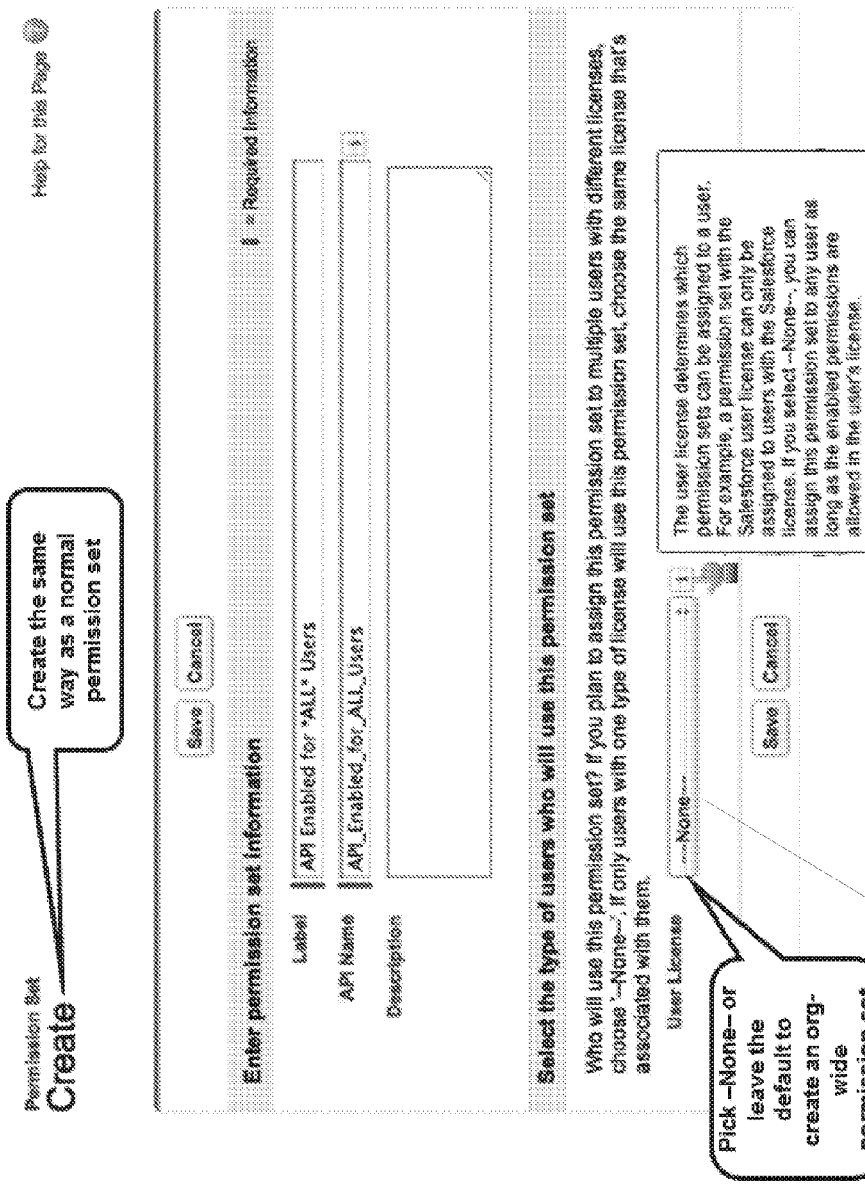
Figure 17:
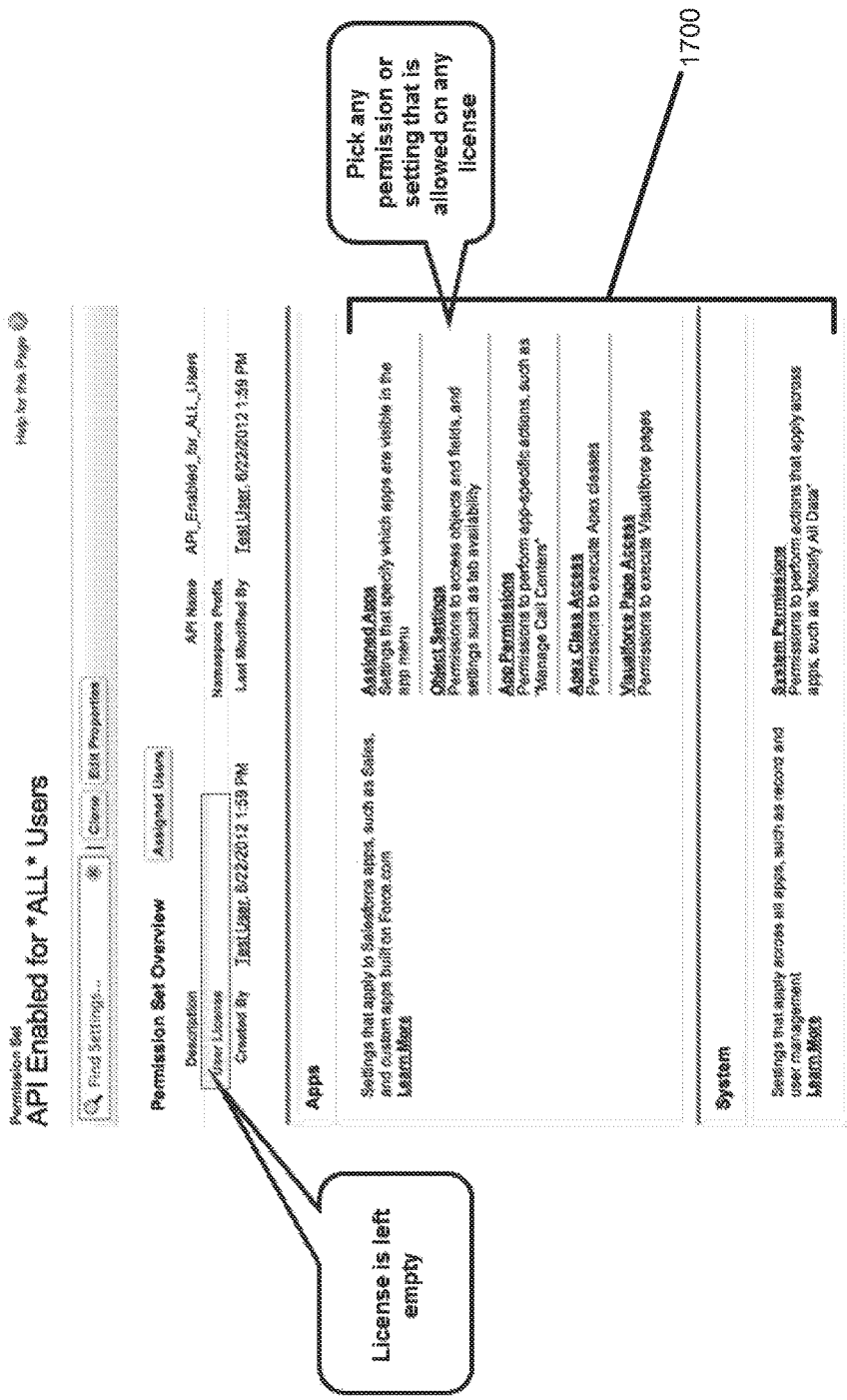

FIGS. 16 and 17 show screenshots of what an administrator may see when creating a new permission set. In FIG. 16, the administrator may create a new permission set "API Enabled for *ALL* Users" and select "—None—" 1600 for the user license that the permission set will be associated with. In FIG. 17, the administrator may then select the permissions 1700 to be included in the permission set. As mentioned, when a permission set is added to a list of permission set for the purpose of delegated administration, a delegated administrator may not modify the permission set.

FIG. 8A shows a graphical representation of a user constraint associated with a user, in accordance with some implementations. In FIG. 8A, a user 810 is associated with a user constraint 820. The user constraint 820 includes a group of permissions that the user 810 is permitted to have. In some implementations, the user constraint 820 may be a user license specific to the user 810 defining the one or more permissions that any user having the user license is permitted to have. In other implementations, the user constraint 820 may be a community, wherein the one or more permissions defined by the user constraint are associated with records, objects, and fields related to a community that the user is a member of. For example, a user may be a member of a customer community. The user constraint associated with the user may include only the permissions related to the customer community that the user is a member of. As a result, assigning the user a permission set that includes permissions unrelated to the customer community may result in an error.

In some implementations, the user constraint 820 may be associated with the user 810 when the user is created. Moreover, the user may only be allowed to be associated with a single user constraint. In another implementation, the user may have no user constraint associated with it, but the user also may not have any permission assigned to him until a user constraint is associated with him. In other implementations, the user constraint 820 may be associated with the user after the user is created, and an administrator may change the user constraint that is associated with the user. As an example, an administrator may downgrade a user's user license from one that grants him all permissions to a user license that grants the user only a subset of all available permissions. Similarly, an administrator may upgrade a user's user license to give the user a larger set of permissions that may be assigned to him.

In FIG. 12B, at block 1216, the server performing method 1200 determines that the permission set to be assigned to the first user does not violate the first user constraint associated with the first user. In some implementations, the server determines whether the permission assignment violates the user constraint by determining whether all of the permissions of the permission set exist in the first group of permissions defined by the first user constraint.

Figure 8C:
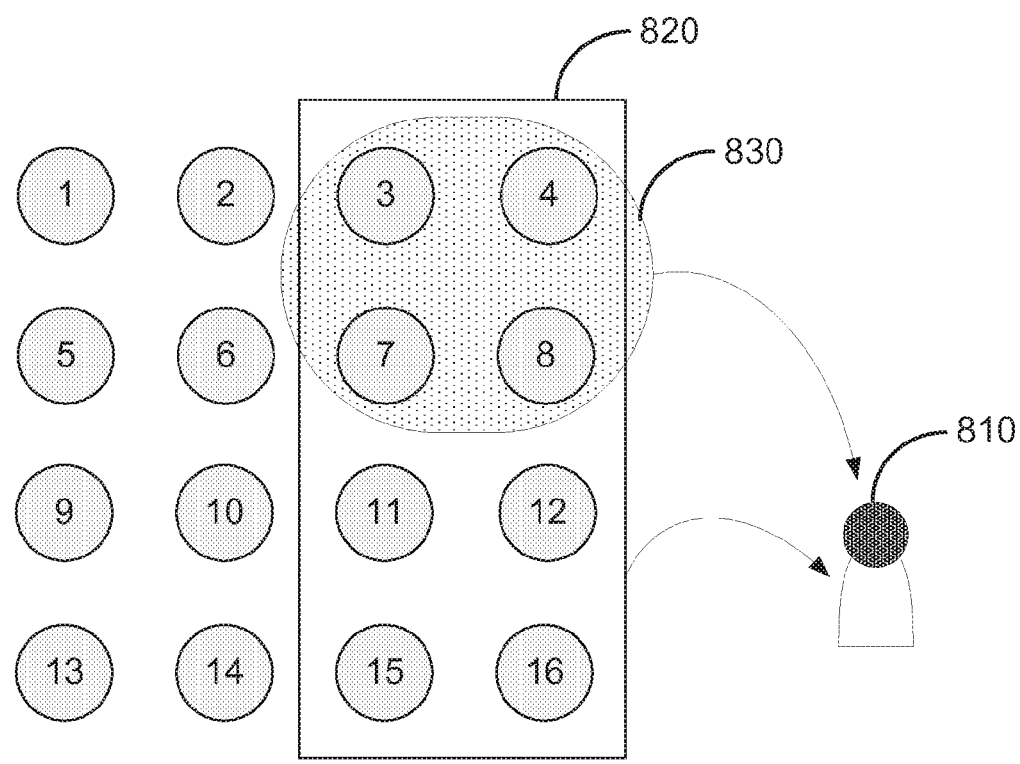
FIG. 8C shows a graphical representation of a valid permission assignment to a user via a permission set, in accordance with some implementations.

FIG. 8C shows a graphical representation of a valid permission assignment to a user via a permission set, in accordance with some implementations. In FIG. 8C, a permission set 830 is assigned to a user 810, and the user 810 is associated with a user constraint 820. This is a valid assignment of the permission set 830 to the user 810, because all of the permissions of the permission set 830—permissions 3, 4, 7, 8—are also contained in the user constraint 820.

In some implementations, the permission set 830 may be associated with a user constraint 820, such as a user license, before it is assigned to a user 810. In these implementations, the permissions server 405 of FIG. 4 may validate the permission set when the permission set is created, obviating the need to validate the permission set when it is assigned to a user having the user license.

In another implementation, the permission set 830 may be defined independent of a user license, prior to assigning the permission set to a user. In these implementations, when the permission set is assigned to a user, who is associated with a user license, the permission server 405 may then validate that assignment by determining if the permissions of the permission set are all contained within the user constraint.

In some implementations, the server may determine that the permission set to be assigned to the first user does violate the first user constraint associated with the first user.

Figure 9:
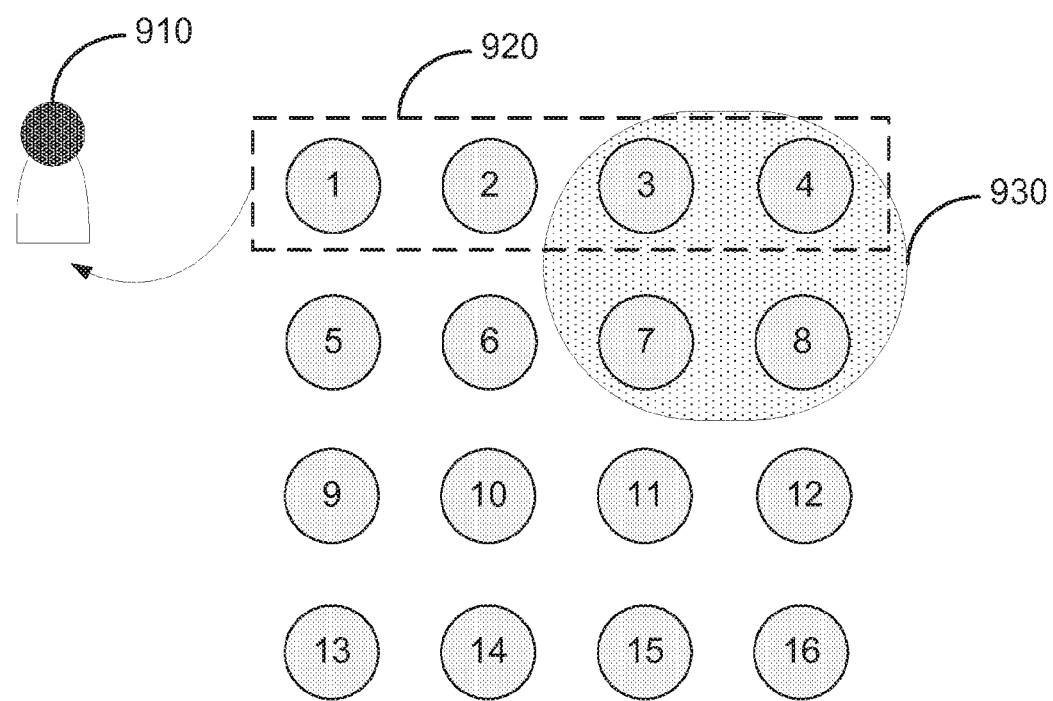
FIG. 9 shows a graphical representation of an invalid permission assignment to a user via a permission set, in accordance with some implementations.

As an example, FIG. 9 shows a graphical representation of an invalid permission assignment to a user via a permission set, in accordance with some implementations. In FIG. 9, a permission set 930 is assigned to a user 910, and the user 910 is associated with a user constraint 920. In some implementations, the user constraint 920 is a user license defining what permissions a user having the user license may have. In FIG. 9, the permission set 930 has been defined to include permissions 3, 4, 7, and 8. When an administrator of the server attempts to assign the permission set 930 to the user 910, the permission server 405 identifies the user constraint 920 associated with the user 910, and determines whether the assignment of the permission set 930 to user 910 violates the user constraint 920. In this implementation, the permission set 930 includes permissions—permissions 7 and 8—that are not included in the user license 920. Consequently, the permission server 405 may determine that assigning the permission set 930 to user 910 would violate the user license 920.

In another implementation, the permission server 405 may require that a permission set be associated with a user license when the permission set is created. In this implementation, the validation of the permission set 930 could occur when the permission set 930 is created and associated with the user license 920.

Figure 18:
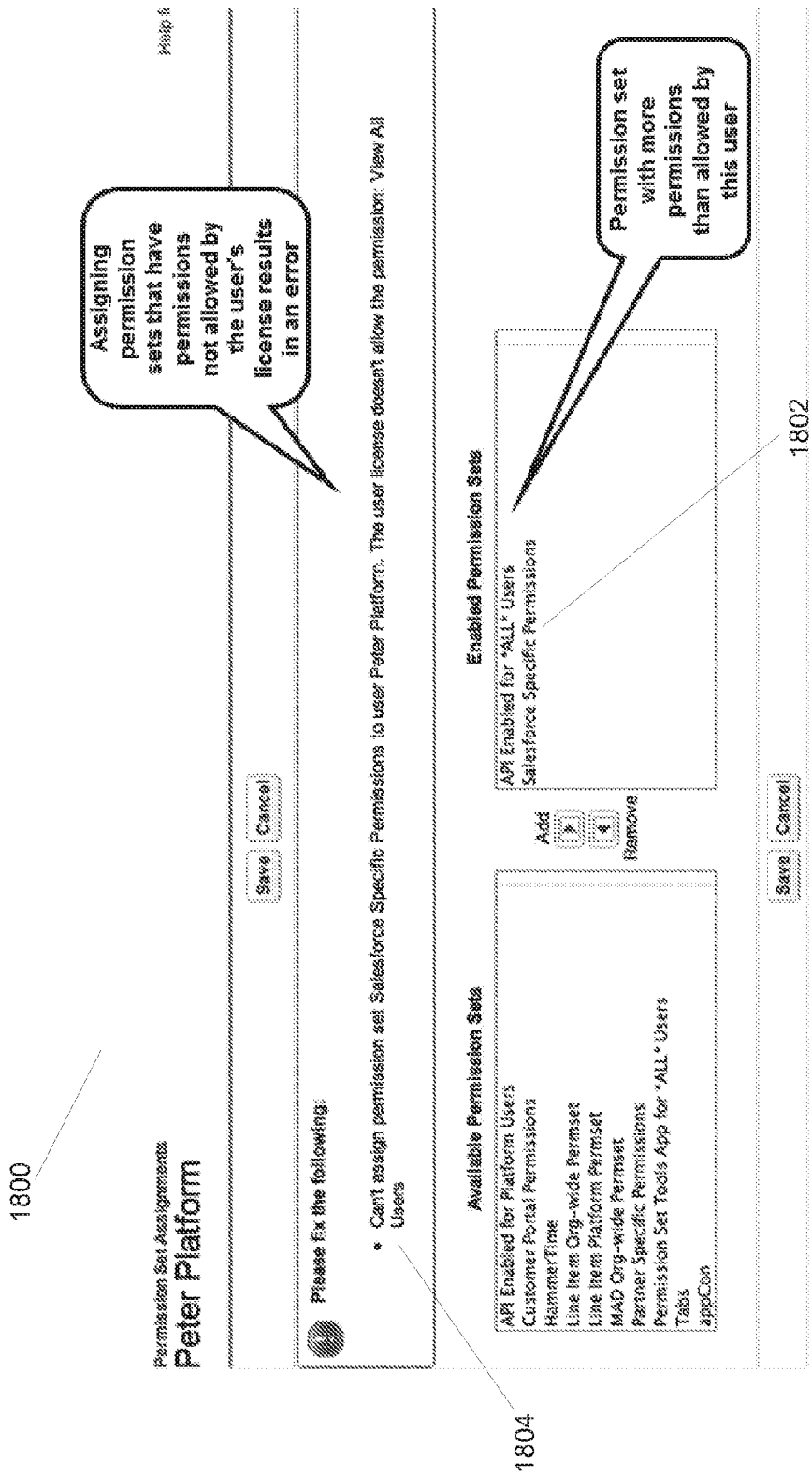

FIG. 18 shows a screenshot of an error when attempting to assign to a user a permission set that violates the user license associated with the user. In FIG. 18, the administrator attempted to assign the permission set "Salesforce Specific Permissions" 1802 to the user Peter Platform. The "Salesforce Specific Permissions" permission set includes the permission "View All Users." As it turns out, Peter Platform's user license does not include the permission "View All Users." Consequently, the user interface 1800 returns an error 1804 when the administrator attempts to assign the permission set to the Peter Platform.

In FIG. 12B, at block 1220, the server performing method 1200 assigns the permission set to the first user. In some implementations, a record is created in the permission database indicating that the permission set has been assigned to the first user.

Figure 13:
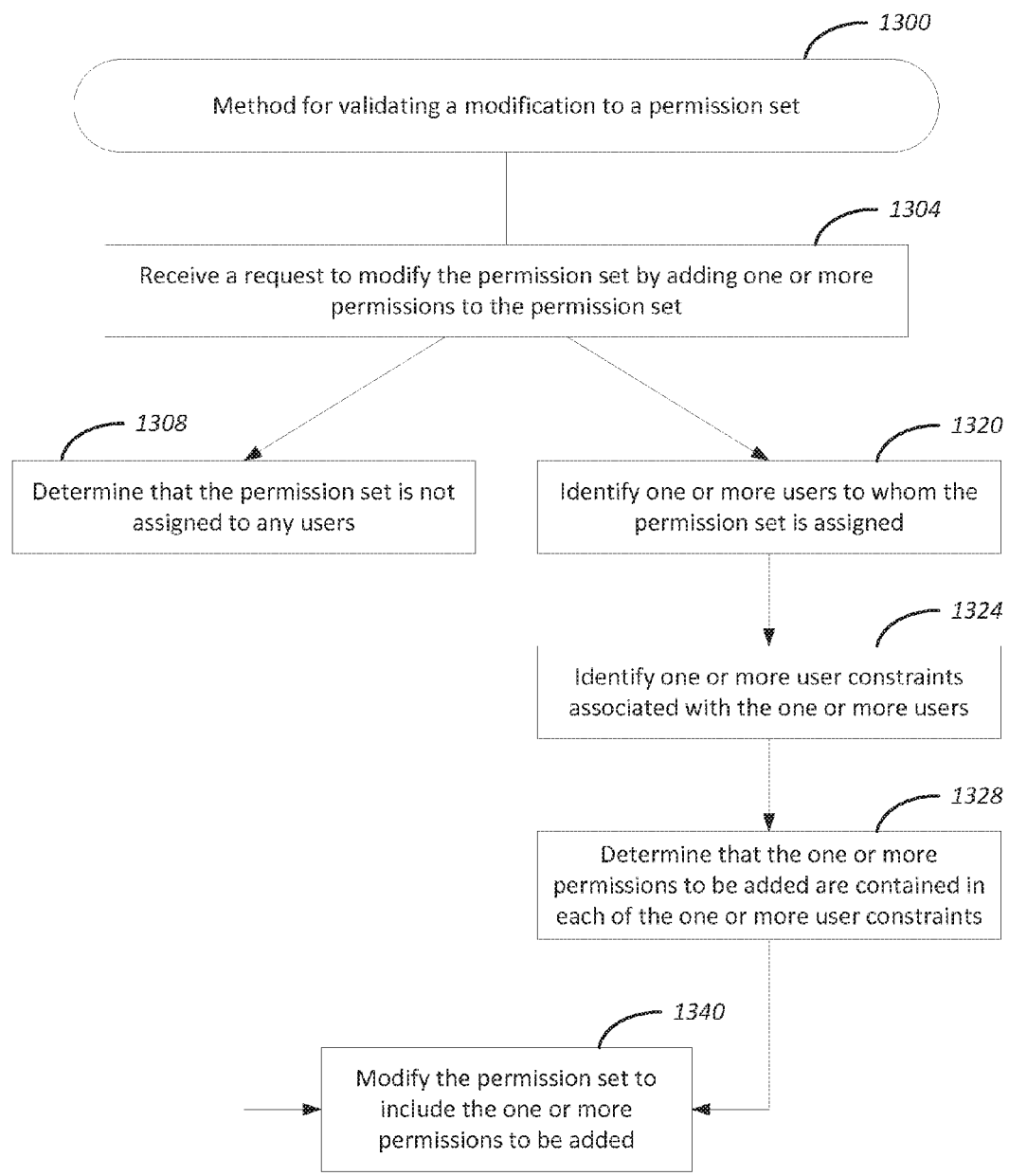
FIG. 13 shows a flowchart of an example of a computer implemented method 1300 for validating a modification to a permission set, in accordance with some implementations.

FIG. 13 shows a flowchart of an example of a computer implemented method 1300 for validating a modification to a permission set, in accordance with some implementations.

In FIG. 13, at block 1304, the server performing method 1300 receives a request to modify the permission set by adding one or more permissions to the permission set.

Figure 19:
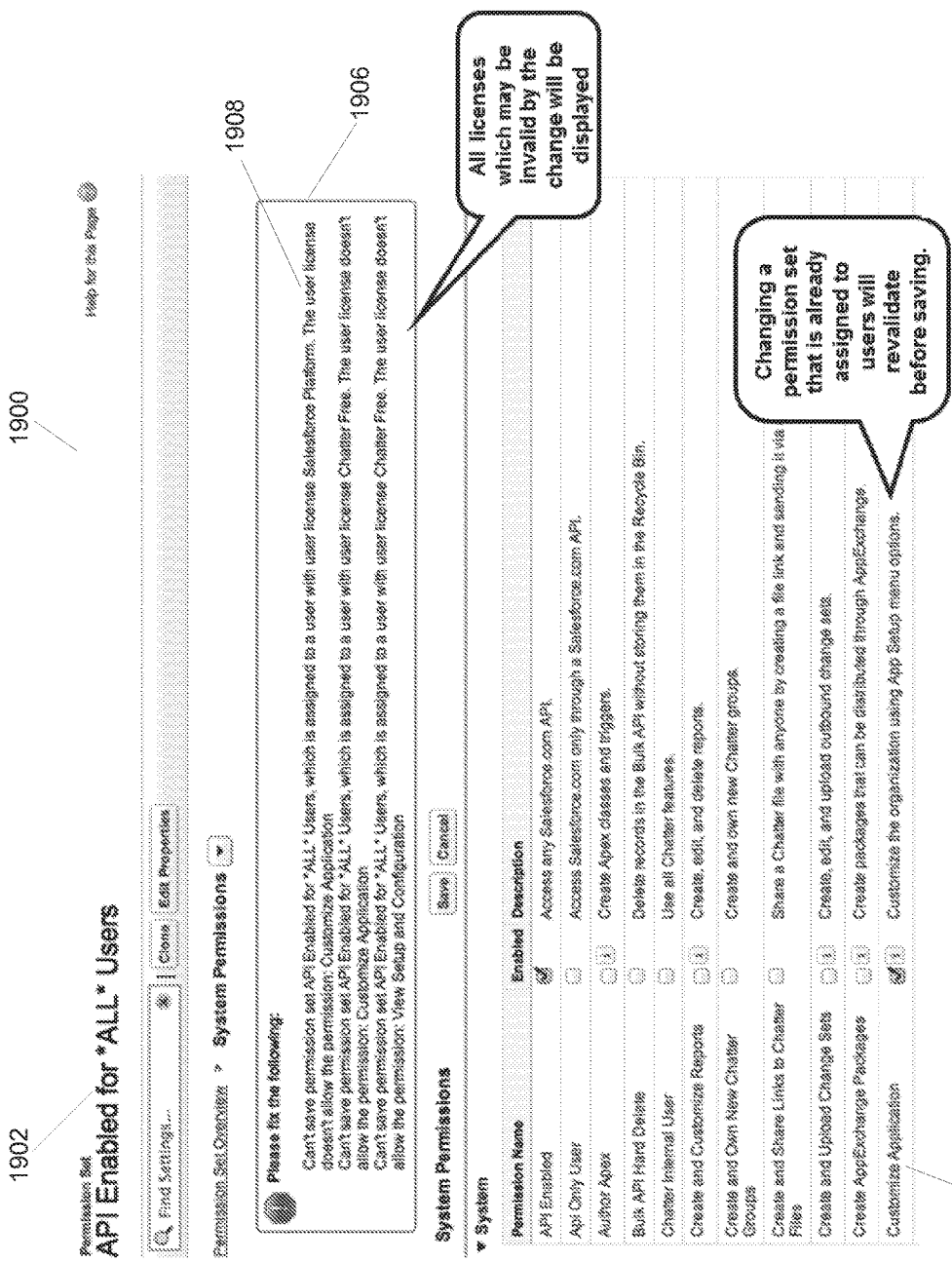

In some implementations, an administrator may wish to add more permissions to an existing permission set. For example, as described in FIG. 19, "API Enabled for *ALL* Users" is a permission set that is already assigned to multiple users associated with different user licenses, and the permission set initially includes only the permission "API Enabled," granting users access to any Salesforce.com API. In FIG. 19, the administrator attempts to add the permission "Customized Application" to the permission set, allowing users to customize the organization using App Setup menu options. When the administrator selects "Customized Application" and clicks "Save", the request is submitted to the server to modify the permission set to include the new permission.

Figure 10A:
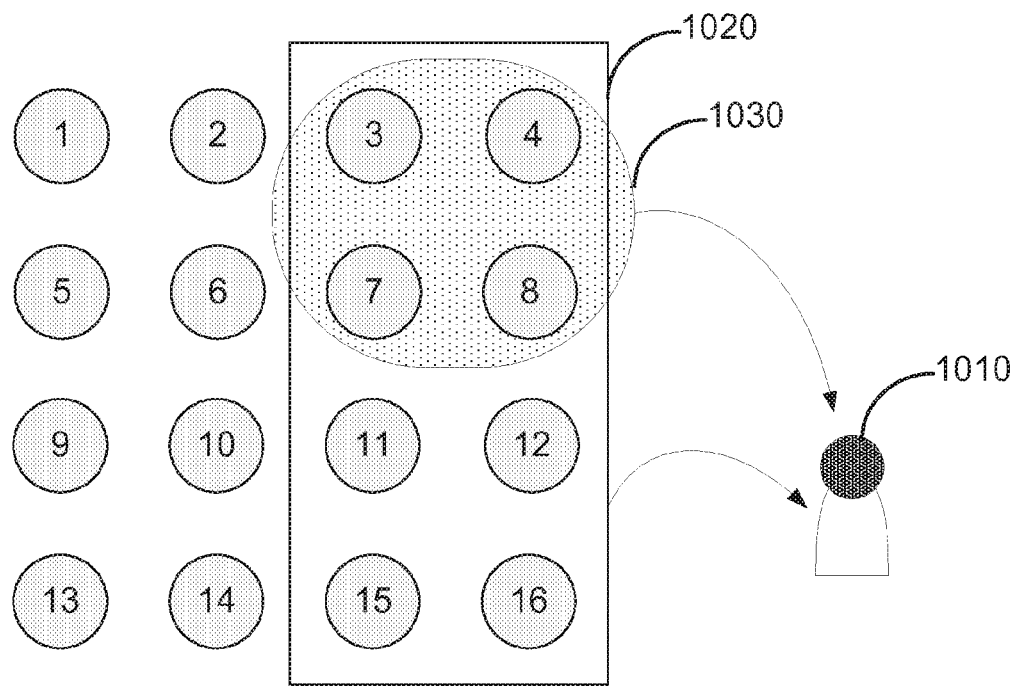
FIG. 10A shows a graphical representation of a permission assignment to a user via a permission set, in accordance with some implementations.

FIG. 10A shows a graphical representation of a permission assignment to a user via a permission set, in accordance with some implementations. In FIG. 10A, a user 1010 is associated with a user license 1020, which defines the permissions that the user is permitted to have. An initial permission set 1030 is validly assigned to the user 1010, according to method 1200 described above.

Figure 10B:
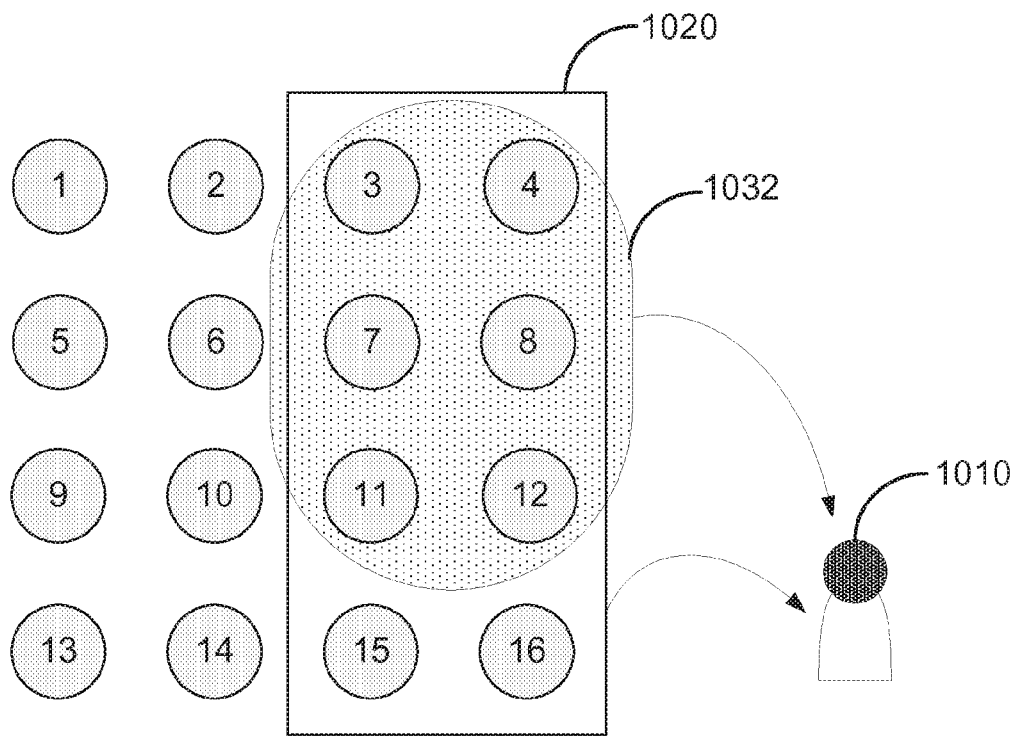
FIG. 10B shows a graphical representation of modification of a permission set assigned to a user, in accordance with some implementations.

As an example, FIG. 10B shows a graphical representation of modification of a permission set assigned to a user, in accordance with some implementations. In FIG. 10B, the requested permission set 1032 is the modification of the initial permission set 1030 of FIG. 10A.

In other implementations, the modification to the permission set may be to remove one or more permissions from the permission set. In these implementations, the server does not need to validate the request and the permission set may be modified as requested without validation.

In FIG. 13, at block 1308, the server performing method 1300 determines that the permission set is not assigned to any users. In some implementations, the server may determine this by accessing the permission database and determining that no database record exists in the permission database associating the permission set with a user. Consequently, there is no group of permissions that the permissions of the permission set need to be a part of in order to be valid.

In FIG. 13, at block 1340, the server performing method 1300 modifies the permission set to include the one or more permissions to be added. In some implementations, the permission server 405 updates the permission database 415 by creating records associating the permission set with each of the one or more permissions to be added.

In FIG. 13, at block 1320, the server performing method 1300 identifies one or more users to whom the permission set is assigned.

Returning to the example of FIG. 10B, the server may identify user 1010 as a user to whom the permission set 1032 is assigned. This information may be stored in the permission database 415 of the permission server 405. In some implementations, the permission set 1032 may be assigned to more than one user, and the server may identify each of those users to whom the permission set 1032 has been assigned. In the example of FIG. 10B, the permission set 1032 is assigned to only one user, user 1010. In some implementations, the user 1010 may have more than one permission set 1032 assigned to him.

In FIG. 13, at block 1324, the server performing method 1300 identifies one or more user constraints associated with the one or more users. In some implementations, the user constraint may be the user license associated with each user. As an example, a user license may be a "Sales Manager" license. In the example of FIG. 10B, the user 1010 is associated with a user constraint 1020, which includes permissions 3, 4, 7, 8, 11, 12, 15, and 16. In some implementations, a user must be associated with a user constraint before the user may be assigned any permissions.

In FIG. 13, at block 1328, the server performing method 1300 determines that the one or more permissions to be added are contained in each of the one or more user constraints. In the example of FIG. 10B, the permissions to be added are permissions 11 and 12, which are contained in the requested permission set 1032 but not in the initial permission set 1030 of FIG. 10A. The server will determine that permissions 11 and 12 are included in the user constraint 1020 associated with user 1010, meaning the requested permission set 1032 does not violate the user constraint 1020 of user 1010. In some implementations, the permission server 405 performs this determination. Once the server has validated the requested modification to the permission set, it will modify the permission set as requested and update the permission set in the permission database.

Figure 14:
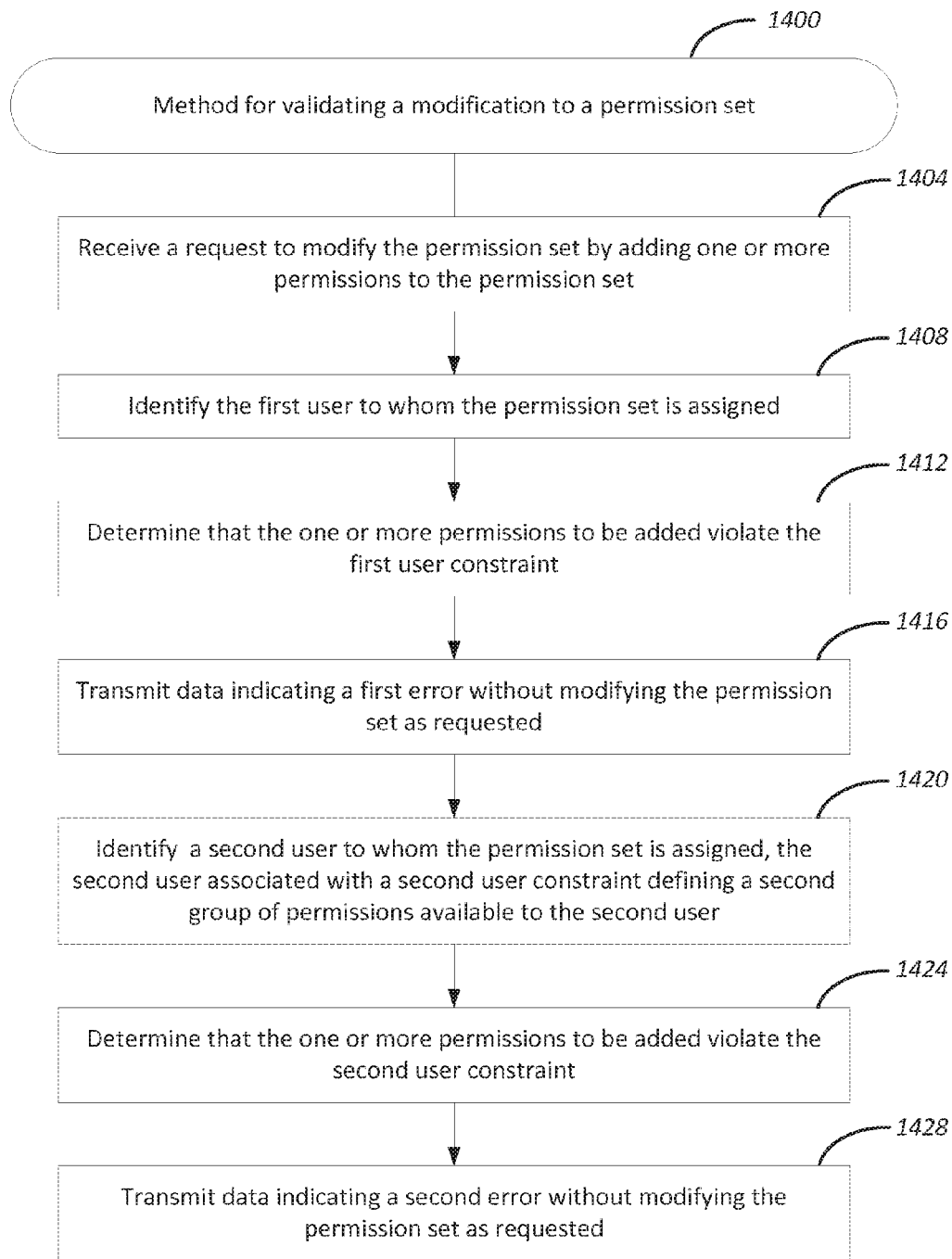
FIG. 14 shows a flowchart of an example of a computer implemented method 1400 for validating a modification to a permission set, in accordance with some implementations.

FIG. 14 shows a flowchart of an example of a computer implemented method 1400 for validating a modification to a permission set, in accordance with some implementations.

In FIG. 14, at block 1404, a server performing method 1400 receives a request to modify the permission set by adding one or more permissions to the permission set, as generally described above at block 1304 of method 1300.

Returning to the example of FIG. 10A, the user 1010 is associated with the user license 1020, which defines the permissions that the user is permitted to have. The initial permission set 1030 is initially assigned to the user 1010.

Figure 10C:
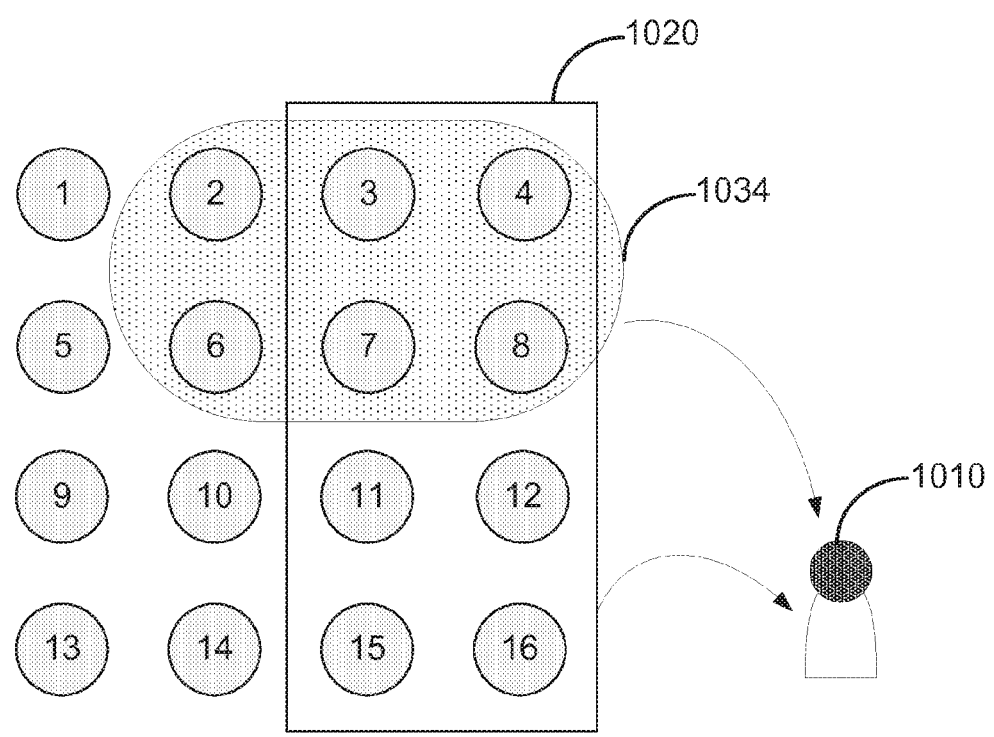
FIG. 10C shows a graphical representation of modification of a permission set assigned to a user, in accordance with some implementations.

FIG. 10C shows a graphical representation of modification of a permission set assigned to a user, in accordance with some implementations. In FIG. 10C, requested permission set 1034 is the requested modification to the initial permission set 1030 from FIG. 10A. The one or more permissions to be added are permissions 2 and 6.

In some implementations, the request received by the server includes the initial permission set 1030 from FIG. 10A and the one or more permissions to be added, permissions 2 and 6. The request may come from an administrator attempting to add permissions to a permission set. For example, there may exist a Sales Manager permission set, which is assigned to users in a sales manager role of an organization, and which include permissions required for the sales manager users to do their jobs in the organization. The administrator may wish to expand the group of permissions given to all of the sales manager users. An expedient way to do this would be to modify the Sales Manager permission set that is already assigned to all of the sales manager users to include the additional permissions that the administrator wishes to grant to the sales manager users. The administrator may then submit a request to the server identifying the Sales Manager permission set and the additional permissions that he wishes to add to the permission set.

In FIG. 14, at block 1408, the server performing method 1400 identifies the first user to whom the permission set is assigned. Returning to the example of FIG. 10C, the server may identify user 1010 as the first user to whom permission set 1034 is assigned.

In FIG. 14, at block 1412, the server performing method 1400 determines that the one or more permissions to be added violate the first user constraint. In some implementations, the server may determine that a permission set violates a user constraint by identifying one or more permissions in the permission set that are not contained in the group of permissions associated with the user constraint.

Returning to the example of FIG. 10C, the requested permission set 1034 includes permissions 2 and 6, which are not contained within the group of permissions of user constraint 1020. Consequently, the requested modification to the permission set 1034 violates the user constraint of user 1010.

In FIG. 14, at block 1416, the server performing method 1400 transmits data indicating a first error without modifying the permission set as requested. In some implementations, the transmitted data may include a message that the permission set was not modified as requested. In other implementations, the transmitted data may identify the one or more permissions of the requested modification that violated the user constraint.

FIG. 19 shows a screenshot of an error message when attempting to modify a permission set to include an additional permission that violates at least one user constraint. In FIG. 19, the administrator is attempting to modify the "API Enable for *ALL* Users" permission set 1902 to add the "Customized Application" permission 1904 and the "View Setup and Configuration" permission (not shown) to the permission set. When the administrator attempts to apply the modification, an error message 1906 appears in the user interface 1900 displaying the user licenses that are violated by the attempted modification to the permission set 1902. For example, one error reads: "Can't save permission set API Enabled for *ALL* Users, which is assigned to a user with user license Salesforce Platform. The user license doesn't allow the permission: Customized Application." 1908

Returning to FIG. 14, in some implementations, at block 1420, the server performing method 1400 may identify a second user that the permission set is also assigned to. The second user is associated with a second user license, which defines a second group of permissions that are available to the second user. In some implementations, the first and second user licenses may be different, and they may identify different groups of permissions. In some implementations, the second user license may be identified without identifying the second user. For example, the permission set may be associated in a database table with one or more user licenses or constraints with which the permission set is to be validated when it is modified.

In FIG. 14, at block 1424, the server performing method 1400 determines that the one or more permissions to be added violate the second user constraint.

Figure 11A:
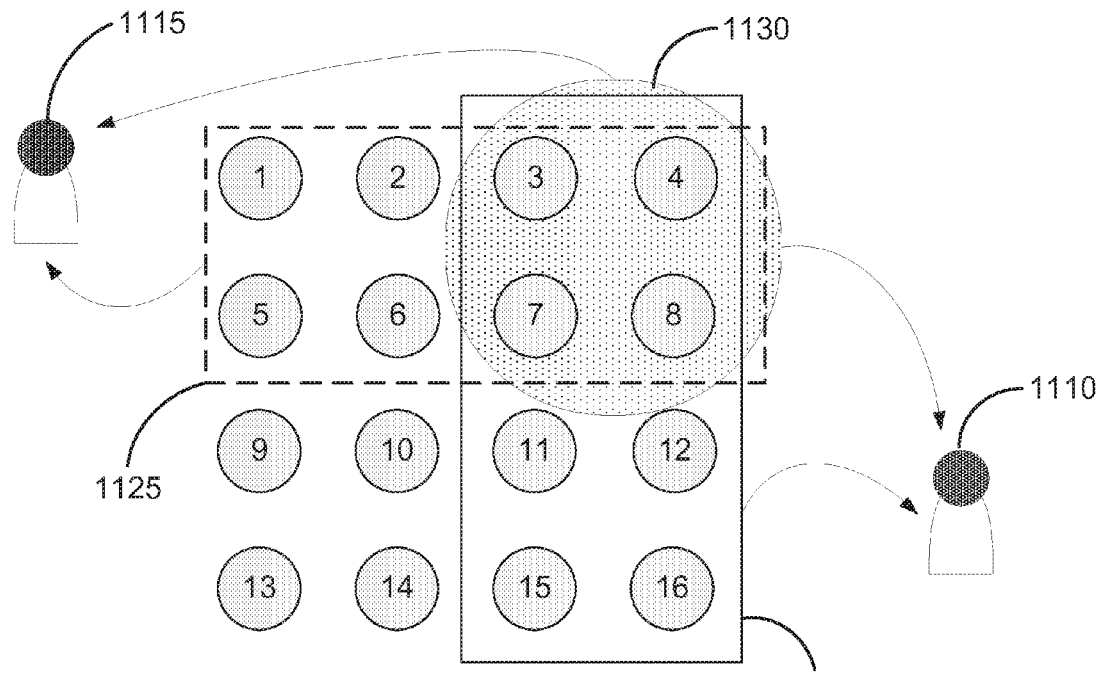
FIG. 11A shows a graphical representation of permission assignments to more than one user via a permission set, in accordance with some implementations.
Figure 11B:
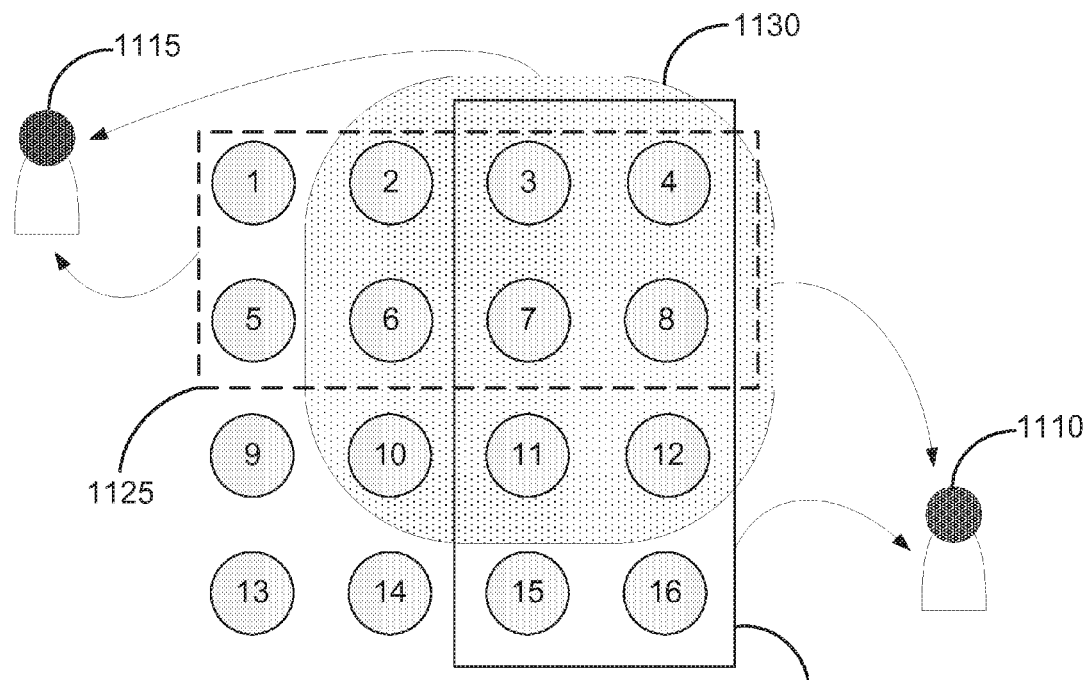
FIG. 11B shows a graphical representation of modification of a permission set assigned to more than one user, in accordance with some implementations.

FIG. 11A shows a graphical representation of permission assignments to more than one user via a permission set, in accordance with some implementations. In FIG. 11A, permission set 1130 is assigned to both first user 1110 and second user 1115. First user 1110 is associated with a first user constraint 1120, which includes permissions 3, 4, 7, 8, 11, 12, 15, and 16. Second user 1115 is associated with a second user constraint 1125, which includes permissions 1-8.

FIG. 11B shows a graphical representation of modification of a permission set assigned to more than one user, in accordance with some implementations. In FIG. 11B, the requested permission set 1130 includes permissions 2-4, 6-8, and 10-12. The requested permission set 1130 violates the first user constraint 1120, because the requested permission set 1330 includes permissions 2, 6, and 10, which are not contained in the first user constraint 1120. Further, the requested permission set 1130 violates the second user constraint 1125, because the requested permission set 1130 includes permissions 10-12, which are not contained in the second user constraint 1125. Consequently, the requested modification to the permission set violates both the first and second user constraints.

In FIG. 14A, at block 1428, the server performing method 1400 transmits data indicating a second error without modifying the permission set as requested.

In some implementations, when a server identifies a first user constraint that is violated by the requested modification, the server may transmit the error message and stop looking for other user constraints that may be violated by the requested modification. In other implementations, the server identifies all of the user constraints that are violated by the requested modification and transmits an error message for each user constraint that is violated. FIG. 19 is an example of the latter implementation, displaying error messages for all of the user licenses that are violated by the attempted modification to the permission set "API Enabled for *ALL* Users."

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2®, by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method comprising:
creating, by a database system, a delegated administrator based on instructions received from a computing system of an administrator;
generating, by the database system, an application container, the application container including a subset of permissions included in an application permission, the subset of permissions being assignable to users by the delegated administrator and providing assigned users access to a plurality of objects;
associating, by the database system, a custom object to the delegated administrator, the delegated administrator having no association with the custom object prior to association;
associating, by the database system, the application container with the custom object, the custom object being associated with the delegated administrator; and
enabling, by the database system, the delegated administrator to manage the custom object based on the subset of permissions included in the application container, wherein managing the custom object includes at least one of assigning and un-assigning the subset of permissions included in the application container to a user managed by the delegated administrator.

2. The method of claim 1, further comprising enabling, by the database system, the administrator to define one or more application containers based on permissions included in the application permission.

3. The method of claim 2, wherein a first customized application container is associated with a first custom object and a second custom object.

4. The method of claim 2, wherein a first customized application container is associated with a first custom object and a second customize application container is associated with a second custom object.

5. The method of claim 2, further comprising creating, by the database system, a delegated administration group, information about the delegated administration group received by a server computing system from the administrator, wherein the delegated administrator is associated with the delegated administration group.

6. The method of claim 5, wherein the delegated administrator is a member of at least two different delegated administration groups.

7. The method of claim 5, further comprising associating, by the database system, the delegated administrator with a user role in an organization, information about the user role received by the database system from the administrator, the user role identifying users and subordinate of the users to be managed by the delegated administrator.

8. The method of claim 7, further comprising associating, by the database system, the delegated administrator with a profile, information about the profile received by the database system from the administrator, the profile is assignable by the delegated administrator to one or more users managed by the delegated administrator.

9. A computer program product comprising computer-readable program code to be executed by one or more processors when retrieved from a non-transitory computer-readable medium, the program code including instructions to:
create, by a database system, a delegated administrator based on instructions received from a computing system of an administrator;
generate, by the database system, an application container, the application container including a subset of permissions included in an application permission, the subset of permissions being assignable to users by the delegated administrator and providing assigned users access to a plurality of objects;
associate, by the database system, a custom object to the delegated administrator, the delegated administrator having no association with the custom object prior to association;
associate, by the database system, the application container with the custom object, the custom object being associated with the delegated administrator; and
enable, by the database system, the delegated administrator to manage the custom object based on the subset of permissions included in the customize application container, wherein managing the custom object includes at least one of assigning and un-assigning the subset of permissions included in the application container to a user managed by the delegated administrator.

10. The computer program product of claim 9, further comprising enabling, by the database system, the administrator to define one or more application containers based on permissions included in the application permission.

11. The computer program product of claim 10, wherein a first application container is associated with a first custom object and a second custom object.

12. The computer program product of claim 10, wherein a first application container is associated with a first custom object and a second application container is associated with a second custom object.

13. The computer program product of claim 10, further comprising creating, by the database system, a delegated administration group, information about the delegated administration group received by the database system from the administrator, wherein the delegated administrator is associated with the delegated administration group.

14. The computer program product of claim 13, wherein the delegated administrator is a member of at least two different delegated administration groups.

15. The computer program product of claim 13, further comprising associating, by the database system, the delegated administrator with a user role in an organization, information about the user role received by the server computing system from the administrator, the user role identifying users and subordinate of the users to be managed by the delegated administrator.

16. The computer program product of claim 15, further comprising associating, by the database system, the delegated administrator with a profile, information about the profile received by the database system from the administrator, the profile is assignable by the delegated administrator to one or more users managed by the delegated administrator.

17. An apparatus comprising: one or more processors; and a non-transitory computer readable medium storing a plurality of instructions, which when executed, cause the one or more processors to: create, by a database system, a delegated administrator based on instructions received by from a computing system of an administrator;
generate, by the database system, an application container, the application container including a subset of permissions included in an application permission, the subset of permissions being assignable to users by the delegated administrator and providing assigned users access to a plurality of objects;
associate, by the database system, a custom object to the delegated administrator, the delegated administrator having no association with the custom object prior to association;
associate, by the database system, the application container with the custom object, the customized application container including permissions, the custom object being associated with delegated administrator; and
enable, by the database system, the delegated administrator to manage the custom object based on the subset of permissions included in the customize application container, wherein managing the custom object includes at least one of assigning and un-assigning the subset of permissions included in the application container to a user managed by the delegated administrator.

18. The apparatus of claim 17, further comprising enabling, by the database system, the administrator to define one or more application containers based on permissions included in the application permission.

19. The apparatus of claim 18, wherein a first application container is associated with a first custom object and a second custom object.

20. The apparatus of claim 18, wherein a first application container is associated with a first custom object and a second application container is associated with a second custom object.

* * * * *